US012809427B2

(12) United States Patent
Lee et al.

(10) Patent No.: US 12,809,427 B2
(45) Date of Patent: Nov. 24, 2026

(54) ELECTRONIC APPARATUS INCLUDING HEAT DISSIPATION SHEET

(71) Applicant: SAMSUNG ELECTRONICS CO., LTD., Suwon-si (KR)

(72) Inventors: Kyuhwan Lee, Suwon-si (KR); Haejin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 82 days.

(21) Appl. No.: 18/902,001

(22) Filed: Sep. 30, 2024

(65) Prior Publication Data

US 2025/0021136 A1 Jan. 16, 2025

Related U.S. Application Data

(63) Continuation of application No. PCT/KR2023/004357, filed on Mar. 31, 2023.

(30) Foreign Application Priority Data

Mar. 31, 2022 (KR) ........................ 10-2022-0040722
Oct. 5, 2022 (KR) ........................ 10-2022-0127341

(51) Int. Cl.
*G06F 1/16* (2006.01)
*G06F 1/20* (2006.01)

(52) U.S. Cl.
CPC .......... *G06F 1/1675* (2013.01); *G06F 1/1652* (2013.01); *G06F 1/203* (2013.01)

(58) Field of Classification Search
CPC ...... G06F 1/1675; G06F 1/1652; G06F 1/203; G06F 1/16; H04M 1/02; H05K 7/20
See application file for complete search history.

(56) References Cited

U.S. PATENT DOCUMENTS 10,257,945 B2 * 4/2019 Kim ...................... G06F 1/1652
10,564,676 B2 * 2/2020 Kwon ...................... H04N 5/64
10,747,269 B1 * 8/2020 Choi ...................... G06F 1/1652
10,750,625 B2 * 8/2020 Park ...................... G06F 1/1652
10,783,809 B2 * 9/2020 Kim ...................... G09F 9/301
10,963,014 B1 * 3/2021 Park ...................... G06F 1/1652
11,042,195 B1 * 6/2021 Hong ...................... G06F 1/1681
(Continued)

FOREIGN PATENT DOCUMENTS

CN 214569804 U 11/2021
KR 100874690 B1 12/2008
(Continued)

*Primary Examiner* — Rockshana D Chowdhury
(74) *Attorney, Agent, or Firm* — Sughrue Mion, PLLC

(57) ABSTRACT

An electronic apparatus includes: a first housing; a second housing coupled to the first housing such as to be slidable in a first direction away from the first housing and in a second direction opposite to the first direction; a roller including a rotation shaft oriented perpendicular to the first direction and the second direction, the roller being in at least one from among the second housing and the first housing; and a heat transfer sheet including a flexible and thermally conductive material, wherein one end portion of the heat transfer sheet is coupled to the roller, wherein the roller is configured to wind the heat transfer sheet in a case where the second housing slides in the second direction and unwind the heat transfer sheet in a case where the second housing slides in the first direction.

20 Claims, 24 Drawing Sheets

(56) References Cited

U.S. PATENT DOCUMENTS

| | | | | |
|---|---|---|---|---|
| 11,140,252 | B1 * | 10/2021 | Choi | G06F 1/1624 |
| 11,307,617 | B2 | 4/2022 | Ko et al. | |
| 12,262,489 | B2 * | 3/2025 | Seo | G06F 1/1652 |
| 12,439,547 | B2 * | 10/2025 | Liu | H05K 7/20145 |
| 12,484,434 | B2 * | 11/2025 | Kim | H05K 1/028 |
| 2010/0098370 | A1 | 4/2010 | Kock et al. | |
| 2015/0343954 | A1 * | 12/2015 | Shin | B60R 5/047 160/264 |
| 2016/0374228 | A1 | 12/2016 | Park et al. | |
| 2017/0013726 | A1 * | 1/2017 | Han | G09F 15/0062 |
| 2017/0156225 | A1 * | 6/2017 | Heo | G06F 1/1652 |
| 2017/0212556 | A1 | 7/2017 | Jovanovic | |
| 2017/0212607 | A1 | 7/2017 | Yoon | |
| 2019/0138058 | A1 | 5/2019 | Kwon et al. | |
| 2020/0170114 | A1 * | 5/2020 | Choi | G06F 1/1601 |
| 2020/0196459 | A1 * | 6/2020 | Huang | G06F 1/1652 |
| 2020/0205301 | A1 | 6/2020 | Song | |
| 2020/0245501 | A1 | 7/2020 | Wu et al. | |
| 2020/0356143 | A1 * | 11/2020 | Oh | G06F 1/1616 |
| 2021/0051809 | A1 * | 2/2021 | Song | G06F 1/1652 |
| 2021/0272486 | A1 * | 9/2021 | Khachatryan | G09F 9/301 |
| 2021/0352813 | A1 | 11/2021 | Cho et al. | |
| 2022/0019260 | A1 * | 1/2022 | Kang | G06F 1/1698 |
| 2022/0036772 | A1 | 2/2022 | Wu et al. | |
| 2022/0187873 | A1 * | 6/2022 | Zhang | G06F 1/1601 |
| 2022/0210934 | A1 * | 6/2022 | Lee | G06F 1/1601 |
| 2022/0240399 | A1 * | 7/2022 | Dong | G06F 1/1652 |
| 2022/0253103 | A1 * | 8/2022 | Choi | G06F 1/1624 |
| 2022/0346250 | A1 * | 10/2022 | Kim | B65H 75/10 |
| 2022/0386484 | A1 * | 12/2022 | Kang | G02F 1/13452 |
| 2023/0199097 | A1 | 6/2023 | Jung et al. | |
| 2023/0209740 | A1 * | 6/2023 | Ko | G09F 9/301 361/807 |
| 2023/0213140 | A1 * | 7/2023 | Kim | F16M 11/046 361/679.01 |
| 2023/0217610 | A1 * | 7/2023 | Lee | G06F 1/1652 361/807 |
| 2023/0223504 | A1 | 7/2023 | Moon et al. | |
| 2023/0276583 | A1 * | 8/2023 | Seo | G06F 1/1652 |
| 2024/0040723 | A1 * | 2/2024 | Feng | F16C 11/04 |
| 2024/0064928 | A1 * | 2/2024 | Liu | H05K 7/20145 |
| 2024/0219959 | A1 * | 7/2024 | Yun | G06F 1/1624 |
| 2025/0021136 | A1 * | 1/2025 | Lee | G06F 1/1652 |
| 2025/0044937 | A1 * | 2/2025 | Lee | H04N 21/42203 |
| 2025/0089189 | A1 * | 3/2025 | Mao | G09F 9/301 |
| 2025/0126764 | A1 * | 4/2025 | Yang | H04M 1/02 |
| 2025/0275071 | A1 * | 8/2025 | Woo | H04M 1/0268 |
| 2025/0380606 | A1 * | 12/2025 | Zhang | H10K 77/111 |

FOREIGN PATENT DOCUMENTS

| | | | |
|---|---|---|---|
| KR | 10-2009-0088441 | A | 8/2009 |
| KR | 10-2016-0150253 | A | 12/2016 |
| KR | 10-2017-0089664 | A | 8/2017 |
| KR | 10-2019-0051541 | A | 5/2019 |
| KR | 10-2020-0070336 | A | 6/2020 |
| KR | 10-2020-0076103 | A | 6/2020 |
| KR | 10-2020-0129872 | A | 11/2020 |
| KR | 10-2021-0076492 | A | 6/2021 |
| KR | 10-2324562 | B1 | 11/2021 |
| KR | 10-2023-0108758 | | 7/2023 |
| WO | 2022/158881 | A1 | 7/2022 |

* cited by examiner

ELECTRONIC APPARATUS INCLUDING HEAT DISSIPATION SHEET

CROSS-REFERENCE TO RELATED APPLICATIONS

This application is a bypass continuation of International Application No. PCT/KR2023/004357, filed on Mar. 31, 2023, which claims priority to Korean Application No. 10-2022-0040722, filed on Mar. 31, 2022, and Korean Application No. 10-2022-0127341, filed on Oct. 5, 2022, in the Korean Intellectual Property Office, the contents of which are herein incorporated by reference in their entireties.

BACKGROUND

1. Technical Field

Various embodiments of the present disclosure relate to an electronic apparatus and, more specifically, to an electronic apparatus including a heat dissipation sheet.

2. Brief Description of Related Art

Electronic apparatuses have been developed to gradually become slimmer and have increased rigidity, strengthened design aspects, and differentiated functional elements. An electronic apparatus is gradually changing from a uniform rectangular shape to more diverse shapes. The electronic apparatus may have a changeable structure which may use a large screen display while securing convenient portability. For example, the electronic apparatus may have a structure (e.g., a rollable structure or a slidable structure) in which a flexible display may vary a display area (e.g., a display region) thereof through support of housings operating in a sliding manner with respect to each other. The electronic apparatus may include a drive module (e.g., a drive motor) which may automatically slide one housing based on the other housing.

Components included in the electronic apparatus may include various heat generation sources, such as an application processor, a communication module, a drive motor, a battery, and a display. The local concentration of heat generated from the heat generation source may cause failure of components of the electronic apparatus due to an increase in temperature. To address the issue, the electronic apparatus may include various structures for heat dissipation. For example, the electronic apparatus may include a heat transfer sheet, which is a plate-shaped member having high thermal conductivity.

SUMMARY

An electronic apparatus may include a rollable electronic apparatus (e.g., a slidable electronic apparatus) allowing a display area of a flexible display to be extended and/or reduced. The rollable electronic apparatus may include a first housing and a second housing which are movably coupled relative to each other in a manner of being at least partially fitted together. For example, the first housing and the second housing may operate to be slidable with respect to each other, and support at least a portion of the flexible display (e.g., an expandable display or stretchable display) to guide the flexible display to have a first display area in a slide-in state (e.g., a closed state) and to have a second display area in a slide-out state (e.g., an open state), which is larger than the first display area.

In case that a heat dissipation sheet is disposed in the first housing and/or the second housing to dissipate heat generated from a heat generation source disposed in the first housing and/or the second housing in the electronic apparatus, when the first housing and the second housing slide with respect to each other, the heat dissipation sheet disposed in a mutually overlapping area may be interfered with and thus worn out. In case of making a spacing between the first housing and the second housing to solve the problem, the thickness of the electronic apparatus may be increased and the increased spacing may cause increased instability and reduced convenience in sliding movement.

An electronic apparatus according to various embodiments of the present disclosure may provide a heat transfer sheet which may effectively dissipate heat from the electronic apparatus while suppressing increases in thickness and spacing in the electronic apparatus.

According to embodiments of the present disclosure, an electronic apparatus may be provided and include: a first housing; a second housing coupled to the first housing such as to be slidable in a first direction away from the first housing and in a second direction opposite to the first direction; a roller including a rotation shaft oriented perpendicular to the first direction and the second direction, the roller being in at least one from among the second housing and the first housing; and a heat transfer sheet including a flexible and thermally conductive material, wherein one end portion of the heat transfer sheet is coupled to the roller, wherein the roller is configured to wind the heat transfer sheet in a case where the second housing slides in the second direction and unwind the heat transfer sheet in a case where the second housing slides in the first direction.

According to one or more embodiments of the present disclosure, the heat transfer sheet further includes: a fixed portion fixed to at least one from among the first housing and the second housing; and an extension portion configured to be wound or unwound by the roller.

According to one or more embodiments of the present disclosure, the roller is in the second housing, wherein the fixed portion is fixed with respect to the first housing, and wherein the extension portion is located on an area of the first housing overlapping with the second housing in a case the second housing slides in the second direction.

According to one or more embodiments of the present disclosure, the roller is in the first housing, wherein the fixed portion is fixed with respect to the second housing, and wherein the extension portion is located on an area of the second housing overlapping with the first housing in a case where the second housing slides in the second direction.

According to one or more embodiments of the present disclosure, the display apparatus further includes an elastic member configured to apply a force in the first direction with respect to the roller.

According to one or more embodiments of the present disclosure, the roller further includes a motor configured to drive the roller.

According to one or more embodiments of the present disclosure, the roller further includes: an external body having an internal space, wherein the heat transfer sheet is wound around the external body; an internal shaft passing through the external body and relatively fixed with respect to rotation movement of the roller; and a rotation elastic member fixed with respect to each of the internal shaft and the external body and configured to apply rotation force to the external body.

According to one or more embodiments of the present disclosure, the rotation elastic member includes a spiral torsion spring.

According to one or more embodiments of the present disclosure, the roller further includes: a body on which the heat transfer sheet is wound; journals at two end portions of the body; and a chock configured to support at least a portion of the journals.

According to one or more embodiments of the present disclosure, the roller is configured to be driven by a motor, and wherein one of the journals is supported by the chock, and another one of the journals is supported by the motor.

According to one or more embodiments of the present disclosure, the electronic apparatus further includes an elastic member between the second housing and the chock and configured to apply a force in the first direction with respect to the chock.

According to one or more embodiments of the present disclosure, the chock includes a rotation elastic member configured to apply a rotation force having a rotation direction for winding the heat transfer sheet with respect to the journals.

According to one or more embodiments of the present disclosure, the electronic apparatus further includes a guide member configured to slide in engagement with the roller in a case where the second housing slides in the first direction, and guide the heat transfer sheet to have a flat shape in a case where the heat transfer sheet is unwound.

According to one or more embodiments of the present disclosure, the guide member is at a shoulder portion of the heat transfer sheet.

According to one or more embodiments of the present disclosure, the roller and the guide member are in the second housing, wherein the heat transfer sheet includes a fixed portion fixed to at least one from among the first housing and the second housing, wherein the fixed portion is fixed with respect to the second housing, and wherein the first housing includes a guide reception space in a case where the second housing slides in the first direction.

The electronic apparatus according to various embodiments of the present disclosure includes the roller which is disposed in at least one of the first housing and the second housing slidable coupled to each other and winds or unwinds the heat transfer sheet according to the sliding movement of the first housing and the second housing so as to effectively dissipate heat of the heat generation source while suppressing an increase in thickness and spacing in the electronic apparatus.

In addition, various effects directly or indirectly identified through the present disclosure may be provided.

BRIEF DESCRIPTION OF DRAWINGS

In connection with the description of the drawings, like or similar reference numerals may be used for like or similar elements.

DETAILED DESCRIPTION

Hereinafter, various non-limiting example embodiments of the present disclosure will be described with reference to the accompanying drawings.

Figure 1:
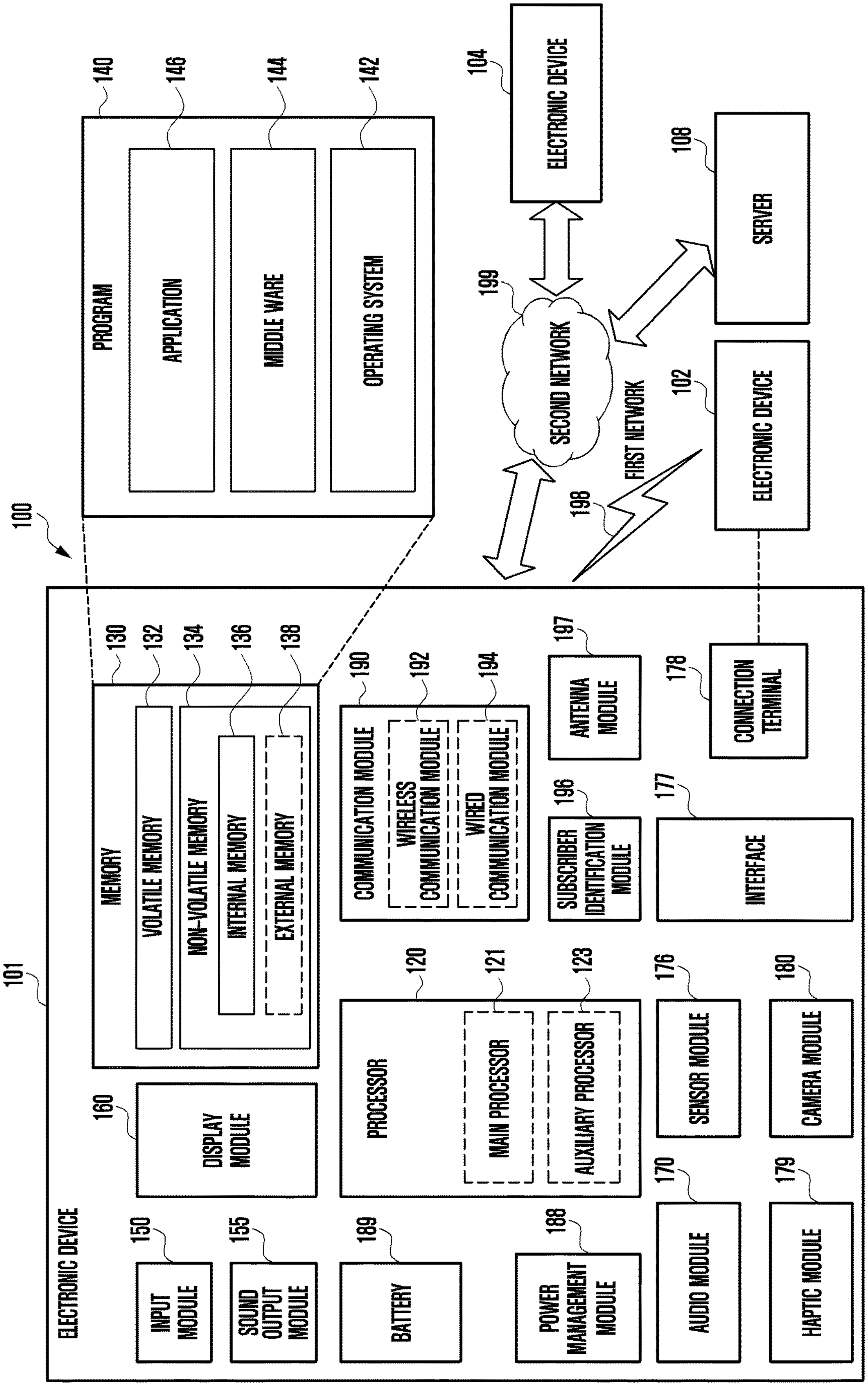
FIG. 1 is a block view illustrating an electronic apparatus in a network environment according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., the electronic device 102, the electronic device 104, or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the electronic device 104 may include an internet-of-things (IoT) device. The server 108 may be an intelligent server using machine learning and/or a neural network. According to an embodiment, the electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
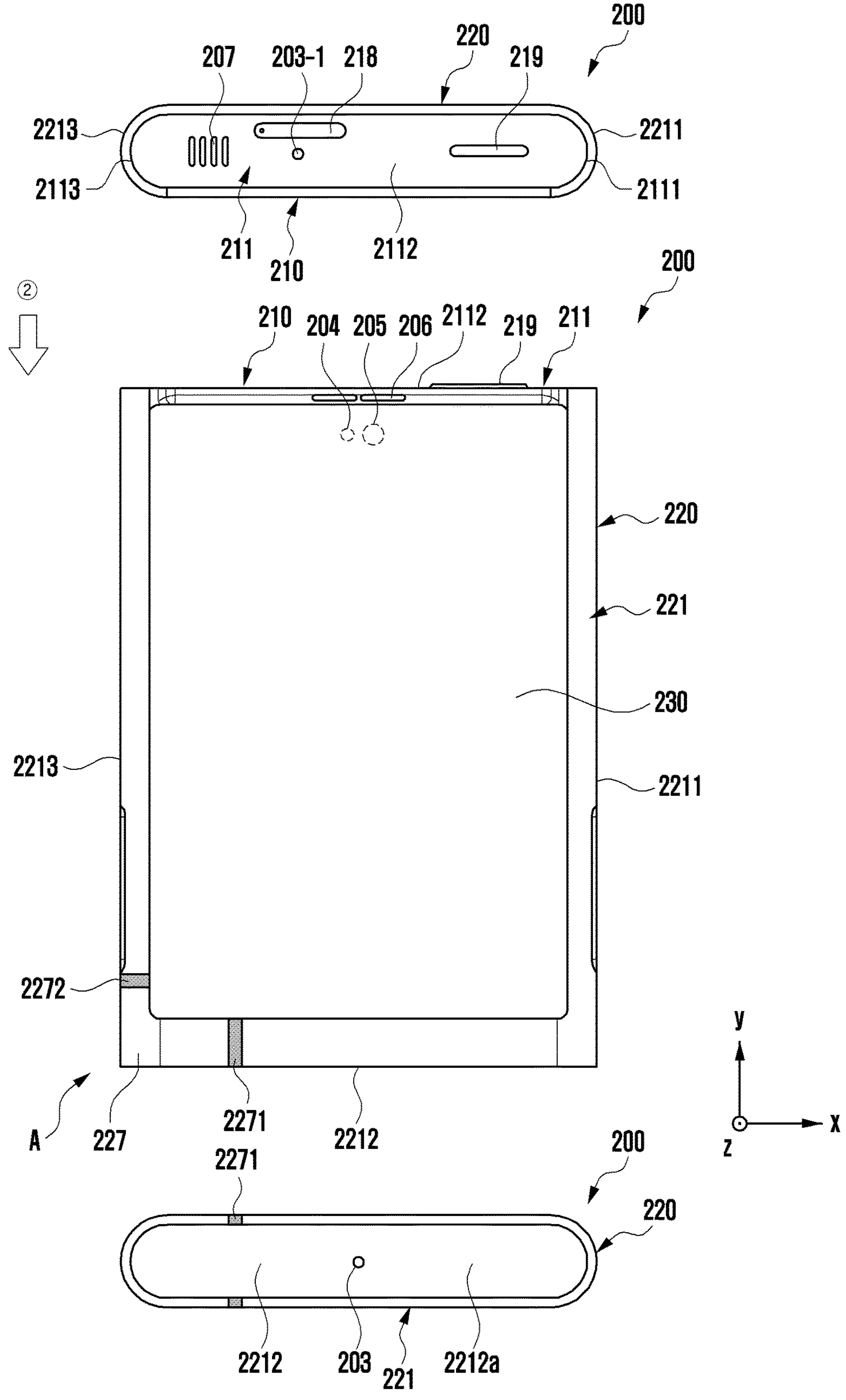
FIGS. 2A and 2B are views illustrating a front surface and a rear surface of an electronic apparatus in a slide-in state according to various embodiments of the present disclosure.
Figure 2B:
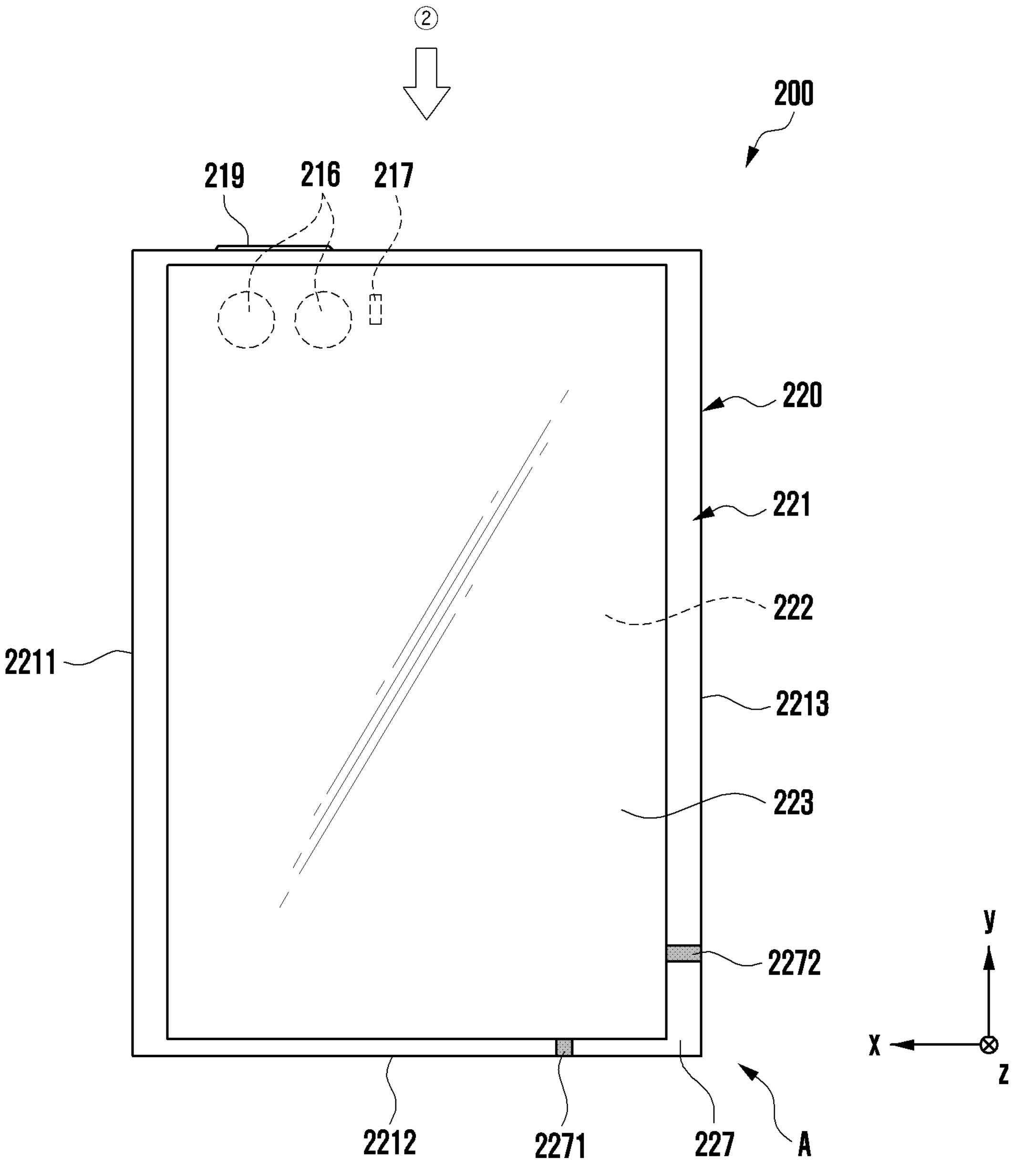
Figure 3A:
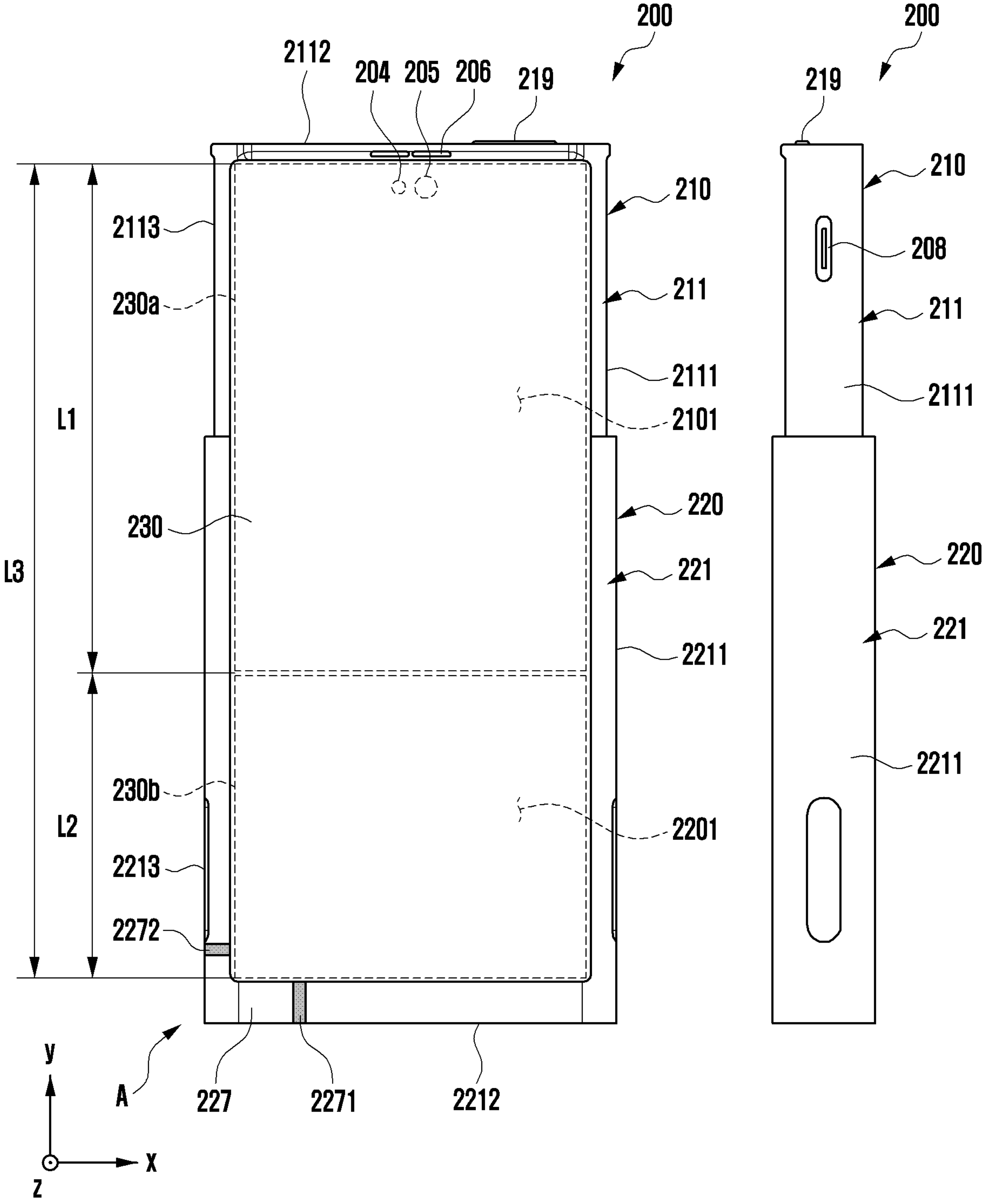
FIGS. 3A and 3B are views illustrating a front surface and a rear surface of an electronic apparatus in a slide-out state according to various embodiments of the present disclosure.
Figure 3B:
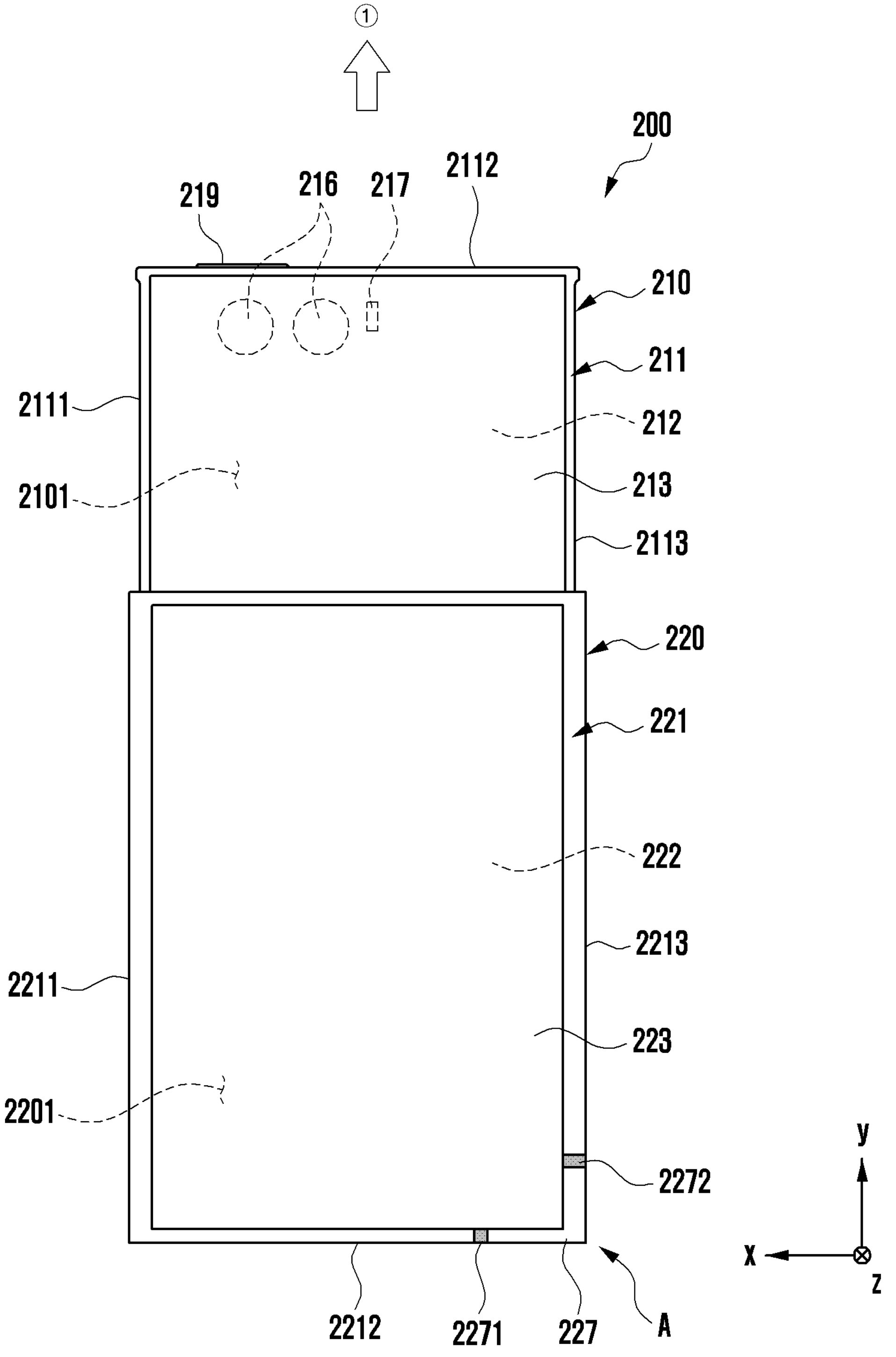

FIGS. 2A and 2B are views illustrating a front surface and a rear surface of an electronic apparatus in a slide-in state according to various embodiments of the present disclosure. FIGS. 3A and 3B are views illustrating a front surface and a rear surface of an electronic apparatus in a slide-out state according to various embodiments of the present disclosure.

The electronic apparatus 200 In FIGS. 2A to 3B may be at least partially similar to the electronic device 101 in FIG. 1 or may further include other embodiments of the electronic device 101.

Referring to FIGS. 2A to 3B, the electronic apparatus 200 may include a first housing 210 (e.g., a first housing structure, a moving unit, and/or a sliding housing), a second housing 220 (e.g., a second housing structure, a fixed portion, and/or a base housing) coupled to the first housing 210 to be slidable in a designated direction (e.g., direction ① or direction ② (e.g., the y-axis direction), and a flexible display 230 (e.g., an expandable display or a stretchable display) disposed to be supported by at least a portion of the first housing 210 and the second housing 220. According to an embodiment, the electronic apparatus 200 may have the first housing 210 disposed to be slid out in a first direction (direction ① or to be slid in in a second direction (direction ②) opposite to the first direction (direction ①) based on the second housing 220 held by the user. According to an embodiment, at least a portion of the first housing 210 including a first space 2101 may be received in a second space 2201 of the second housing 220 to be changed into the slide-in state. According to an embodiment, the electronic apparatus 200 may include a bendable member (or a bendable support member) (e.g., the bendable member 240 in FIG. 4) (e.g., a multi-joint hinge module or a multi-bar assembly) which may at least partially define the same plane with at least a portion of the first housing 210 in the slide-out state and may be at least partially received in the second space 2201 of the second housing 220 in the slide-in state. According to an embodiment, at least a portion of the flexible display 230 may be received in a second space 2201 of the second housing 220 while being supported by the bendable member (e.g., the bendable member 240 in FIG. 4) to be disposed to be invisible from the outside in the slide-in state. According to an embodiment, at least a portion of the flexible display 230 may be disposed to be visible from the outside while being supported by the bendable member (e.g., the bendable member 240 in FIG. 4) for at least partially defining the same plane with the first housing 210 in the slide-out state.

According to various embodiments, the electronic apparatus 200 may include the first housing 210 including a first lateral member 211 and the second housing 220 including a second lateral member 221. According to an embodiment, the first lateral member 211 may include a first lateral surface 2111 having a first length along a first direction (e.g., the y-axis direction), a second lateral surface 2112 extending to have a second length shorter than the first length along a substantially perpendicular direction (e.g., the x-axis direction) from the first lateral surface 2111, and a third lateral surface 2113 extending from the second lateral surface 2112 substantially parallel with the first lateral surface 2111 and having the first length. According to an embodiment, the first lateral member 211 may be at least partially made of a conductive material (e.g., a metal). In some embodiments, the first lateral member 211 may be configured with a combination of a conductive material and a non-conductive material (e.g., polymer). According to an embodiment, the first housing 210 may include a first support member 212 extending from at least a portion of the first lateral member 211 to at least a portion of the first space 2101. According to an embodiment, the first support member 212 may be integrally formed with the first lateral member 211. In some embodiments, the first support member 212 may be configured separately from the first lateral member 211 and structurally coupled to the first lateral member 211.

According to various embodiments, the second lateral member 221 may include a fourth lateral surface 2211 at least partially corresponding to the first lateral surface 2111 and having a third length, a fifth lateral surface 2212 extending in a direction substantially parallel with the second lateral surface 2112 from the fourth lateral surface 2211 and having a fourth length shorter than the third length, and a sixth lateral surface 2213 extending from the fifth lateral surface 2212 to correspond to the third lateral surface 2113 and having the third length. According to an embodiment, the second lateral member 221 may be at least partially formed of a conductive material (e.g., a metal). In some embodiments, the second lateral member 221 may be configured with a combination of a conductive material and a non-conductive material (e.g., polymer). According to an embodiment, at least a portion of the second lateral member 221 may include a second support member 222 extending to at least a portion of the second space 2201 of the second housing 220. According to an embodiment, the second support member 222 may be integrally formed with the second lateral member 221. In some embodiments, the second support member 222 may be configured separately from the second lateral member 221 and structurally coupled to the second lateral member 221.

According to various embodiments, the first lateral surface 2111 and the fourth lateral surface 2211 may be slidably coupled to each other. According to an embodiment, the third lateral surface 2113 and the sixth lateral surface 2213 may be slidably coupled to each other. According to an embodiment, in the slide-in state, the first lateral surface 2111 may overlap the fourth lateral surface 2211 to be disposed to be substantially invisible from the outside. According to an embodiment, in the slide-in state, the third lateral surface 2113 may overlap the sixth lateral surface 2213 to be disposed to be substantially invisible from the outside. In some embodiments, at least a portion of the first lateral surface 2111 and the third lateral surface 2113 may be disposed to be at least partially visible from the outside in the slide-in state. According to an embodiment, in the slide-in state, the first support member 212 may overlap the second support member 222 to be disposed to be substantially invisible from the outside. In some embodiments, in the slide-in state, a portion of the first support member 212 may overlap the second support member 222 to be disposed to be invisible from the outside and a remaining portion of the first support member 212 may be disposed to be visible from the outside.

According to various embodiments, the electronic apparatus 200 may include a first rear cover 213 coupled to the first housing 210 on the rear surface. According to an embodiment, the first rear cover 213 may be disposed through at least a portion of the first support member 212. In some embodiments, the first rear cover 213 may be integrally formed with the first lateral member 211. According to an embodiment, the first rear cover 213 may be formed by coated or colored glass, ceramic, or a metal (e.g., aluminum, stainless steel (STS), or magnesium), or a combination of at least two thereof. In some embodiments, the first rear cover 213 may extend to at least a portion of the first lateral member 211. In some embodiments, at least a portion of the first support member 212 may be replaced with the first rear cover 213.

According to various embodiments, the electronic apparatus 200 may include a second rear cover 223 coupled to the second housing 220 on the rear surface. According to an embodiment, the second rear cover 223 may be disposed through at least a portion of the second support member 222. In some embodiments, the second rear cover 223 may be integrally formed with the second lateral member 221. According to an embodiment, the second rear cover 223 may be formed by coated or colored glass, ceramic, or a metal (e.g., aluminum, stainless steel (STS), or magnesium), or a combination of at least two thereof. In some embodiments, the second rear cover 223 may extend to at least a portion of the second lateral member 221. In some embodiments, at least a portion of the second support member 222 may be replaced with the second rear cover 223.

According to various embodiments, the electronic apparatus 200 may include a flexible display 230 disposed to be supported by at least a portion of the first housing 210 and the second housing 220. According to an embodiment, the flexible display 230 may include a first part 230*a* (e.g., a flat part) always visible from the outside and a second part 230*b* (e.g., a bendable part) extending from the first part 230*a* and at least partially received in the second space 2201 of the second housing 220 to allow at least a portion thereof to be invisible from the outside in the slide-in state. According to an embodiment, the first part 230*a* may be disposed to be supported by the first housing 210 and the second part 230*b* may be disposed to be at least partially supported by a bendable member (e.g., the bendable member 240 in FIG. 4). According to an embodiment, in a state in which the first housing 210 is slid-out in the first direction (direction ①), the second part 230*b* of the flexible display 230 may be disposed to extend from the first part 230*a*, configure substantially the same plane with the first part 230*a*, and visible from the outside while being supported by the bendable member (e.g., the bendable member 240 in FIG. 4). According to an embodiment, in a state in which the second housing 220 is slid-in along the second direction (direction ②), the second part 230*b* of the flexible display 230 may be received in the second space 2201 of the second housing 220 and disposed to be invisible from the outside. Accordingly, the electronic apparatus 200 may guide a display area of the flexible display 230 to be variable according to the first housing 210 moving from the second housing 220 along a designated direction (e.g., the y-axis direction) in a sliding manner.

According to various embodiments, the flexible display 230 may have a length variable in the first direction (direction ①) according to a sliding movement of the first housing 210 moving based on the second housing 220. For example, the flexible display 230 may have a first display area (e.g., an area corresponding to the first part 230*a*) corresponding to a first length L1 in the slide-in state. According to an embodiment, the flexible display 230 may be extended in the slide-out state to have a third display area (e.g., an area including the first part 230*a* and the second part 230*b*) larger than the first display area and corresponding to a third length L3 longer than the first length L1, according to a sliding movement of the first housing 210 which has additionally moved by a second length L2 based on the second housing 220 in the slide-in state.

According to various embodiments, the electronic apparatus 200 may include at least one of an input device (e.g., a microphone 203-1), an audio output device (e.g., a call receiver 206 or a speaker 207), a sensor module 204 or 217, a camera module (e.g., a first camera module 205 or a second camera module 216), a connector port 208, a key input device 219, or an indicator (not shown) each of which is disposed in the first space 2101 of the first housing 210. According to an embodiment, the electronic apparatus 200 may include another input device (e.g., a microphone 203) disposed in the second housing. For another embodiment, the electronic apparatus 200 may be configured to omit at least one of the above-described components or additionally include other components. For another embodiment, at least one of the aforementioned component may be disposed in the second space 2201 of the second housing 220.

According to another embodiment, the input device may include the microphone 203-1. In an embodiment, the input device (e.g., the microphone 203-1) may include multiple microphones arranged so as to detect a direction of a sound. The sound output device may include, for example, the call receiver 206 and the speaker 207. According to an embodiment, the speaker 207 may correspond to the outside through at least one speaker hole formed through the first housing 210 at a position (e.g., the second lateral surface 2112) always exposed the outside regardless of the slide-in/slide-out state. According to an embodiment, the connector port 208 may correspond to the outside through at least one connector hole port formed through the first housing 210 in the slide-out state. In some embodiments, the connector port 208 may correspond to the outside through an opening formed through the second housing and corresponding to the connector port hole in the slide-in state. In some embodiments, the call receiver 206 may include a speaker (e.g., a piezo speaker) operating without a separate speaker hole.

According to various embodiments, the sensor module 204 or 217 may generate an electrical signal or a data value corresponding to an internal operation state or external environment state of the electronic apparatus 200. The sensor module 204 or 217 may include, for example, a first sensor module 204 (e.g., a proximity sensor or an illuminance sensor) disposed on the front surface of the electronic apparatus 200 and/or a second sensor module 217 (e.g., a hear rate monitoring (HRM) sensor) disposed on the rear surface of the electronic apparatus 200. According to an embodiment, the first sensor module 204 may be disposed under the flexible display 230 on the front surface of the electronic apparatus 200. According to an embodiment, the first sensor module 204 and/or the second sensor module 217 may include at least one of a proximity sensor, an illumination sensor, a time of flight (TOF) sensor, an ultrasonic sensor, a fingerprint recognition sensor, a gesture sensor, a gyro sensor, an air pressure sensor, a magnetic sensor, an acceleration sensor, a grip sensor, a color sensor, an infrared (IR) sensor, a biometric sensor, a temperature sensor, or a humidity sensor.

According to various embodiments, the camera module may include a first camera module 205 disposed on the front surface of the electronic apparatus 200 and a second camera module 216 disposed on the rear surface of the electronic apparatus 200. According to an embodiment, the electronic apparatus 200 may include a flash (not shown) located adjacent to the second camera module 216. According to an embodiment, the camera modules (e.g., the first camera module 205 and the second camera module 216) may include one or more of lenses, an image sensor, and/or an image signal processor. According to an embodiment, the first camera module 205 may be disposed under the flexible display 230 and configured to photograph a subject through a portion of an activation area (e.g., a display area) of the flexible display 230.

According to various embodiments, the first camera module 205 of the camera modules and a certain sensor module (e.g., the first sensor module 204) of the sensor modules may be disposed to detect an external environment through the flexible display 230. For example, the first camera module 205 or the certain sensor module (e.g., the first sensor module 204) may be disposed in the first space 2101 of the first housing 210 to be contact with the external environment through a transmission area or a perforated opening formed on the flexible display 230. According to an embodiment, an area facing the first camera module 205 of the flexible display 230 may be a portion of an area configured to display contents, and may be formed to be a transmission area having predetermined transmittance. According to an embodiment, the transmission area may be configured to have transmittance in a range of about 5% to about 20%. Such transmission area may include an area overlapping an effective area (e.g., a view-angle region) of the first camera module 205 through which light for imaging to an image sensor to generate an image passes. For example, the transmission area of the flexible display 230 may include an area having a lower pixel arrangement density and/or wire density than a peripheral area. For example, the transmission area may be substituted with the aforementioned opening. For example, a certain camera module (e.g., the first camera module 205) may include an under display camera (UDC). In some embodiments, a certain sensor module (e.g., the first sensor module 204) may be disposed in the internal space of the electronic apparatus 200 to perform functions thereof without being visually exposed through the flexible display 230.

According to various embodiments, the electronic apparatus 200 may include at least one antenna (e.g., the antenna 214*b* in FIG. 11) electrically connected to a wireless communication circuit (e.g., the wireless communication module 192 in FIG. 1) disposed in the second housing 220. According to an embodiment, the electronic apparatus 200 may include a bezel antenna A disposed through the second lateral member 221, that is conductive, of the second housing 220. For example, the bezel antenna A may be disposed on at least a portion of the fifth lateral surface 2212 and the sixth lateral surface 2213 and may include a conductive part 227 that is electrically segmented through at least one segment part 2271 or 2272 formed of a non-conductive material (e.g., polymer). According to an embodiment, a wireless communication circuit (e.g., the wireless communication module 192 in FIG. 1) may be configured to transmit or receive a wireless signal in at least one frequency band (e.g., about 800 MHz to 6000 MHz) (e.g., a legacy band) designated through the conductive part 227. According to an embodiment, the electronic apparatus 200 may include a lateral cover 2212*a* disposed in the fifth lateral surface 2212 to cover at least a portion of the at least one segment part 2271. In some embodiments, the bezel antenna A may be disposed on at least one of the second lateral surface 2112, the fourth lateral surface 2211, the fifth lateral surface 2212, and the sixth lateral surface 2213. In some embodiments, the electronic apparatus 200 may further include at least one antenna module (e.g., a 5G antenna module or antenna assembly structure) disposed in the internal space (e.g., the first space 2101 or the second space 2201) and disposed to transmit or receive a wireless signal in a frequency band ranging from about 3 GHz to 100 GHz through another wireless communication circuit (e.g., the wireless communication module 192 in FIG. 1).

According to various embodiments, a slide-in/slide-out operation of the electronic apparatus 200 may be performed by driving of a drive module (e.g., a drive motor) under a configured condition (e.g., a configured movement direction and/or a configured movement distance). For example, the slide-in/slide-out operation of the electronic apparatus 200 may be performed through a gearing operation of a rack gear (e.g., the rack gear 2251 in FIG. 4) disposed in the second space 2201 of the second housing 220 and meshed with a pinion gear 261 and a drive motor (e.g., the drive motor 260 in FIG. 4) including the pinion gear 261 disposed in the first space 2101 of the first housing 210. For example, in case of detecting a triggering operation for switching from the slide-in state to the slide-out state or from the slide-out state to the slide-in state, the processor (e.g., the processor 120 in FIG. 1) of the electronic apparatus 200 may operate the drive motor (e.g., the drive motor 260 in FIG. 4) disposed inside the electronic apparatus 200. According to an embodiment, the triggering operation may include selecting (e.g., touching) an object displayed on the flexible display 230 or operating a physical button (e.g., a key button) included in the electronic apparatus 200.

Figure 4:
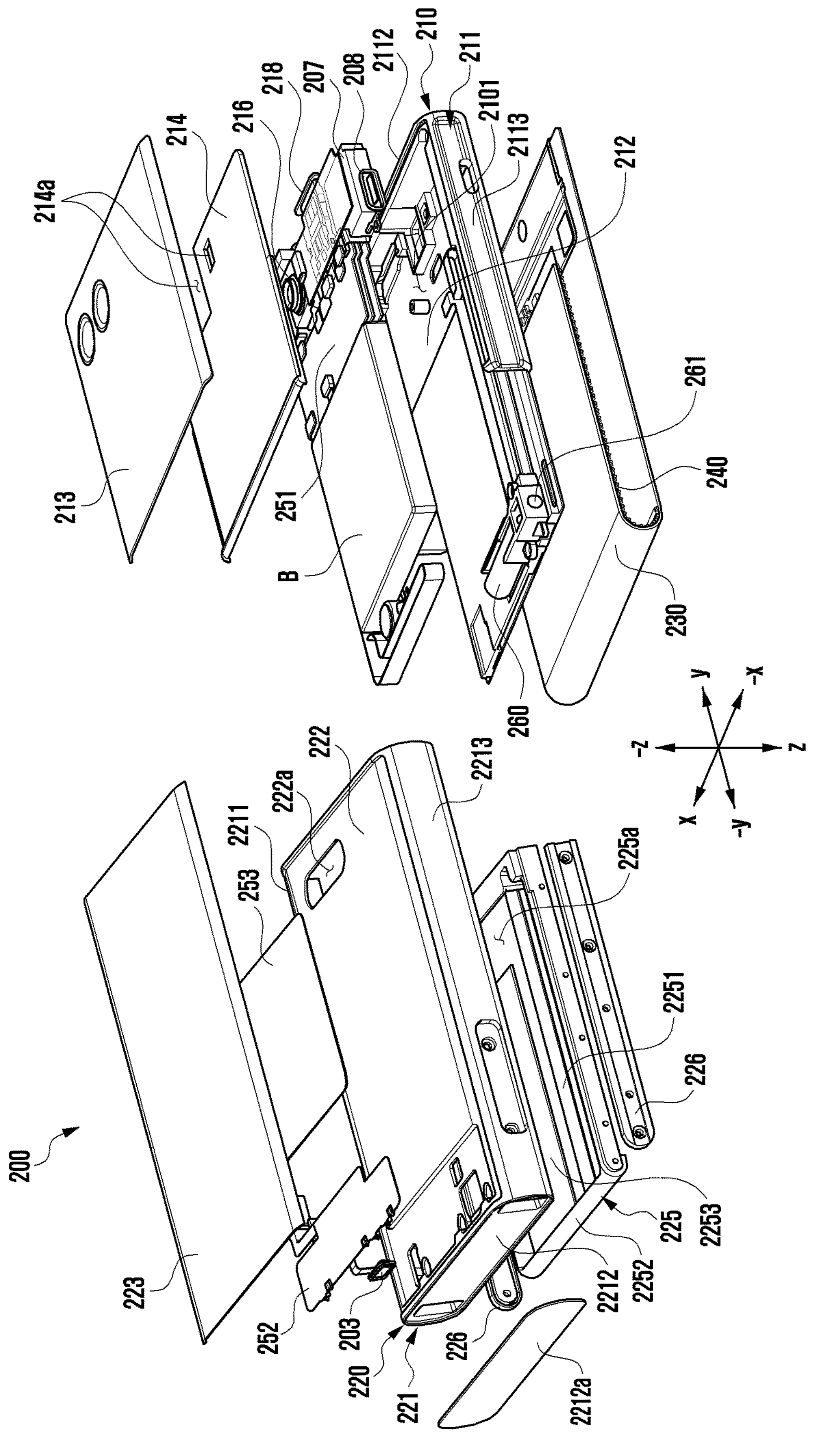
FIG. 4 is an exploded perspective view of an electronic apparatus according to an embodiment of the present disclosure.

FIG. 4 is an exploded perspective view of an electronic apparatus according to an embodiment of the present disclosure.

In describing the electronic apparatus 200 of FIG. 4, components that are substantially the same as those of the electronic apparatus 200 of FIGS. 2A to 3B are given the same reference numerals, and detailed descriptions thereof may be omitted.

Referring to FIG. 4, the electronic apparatus 200 may include a first housing 210 including a first space 2101, a second housing 220 slidably coupled to the first housing 210 and including a second space (e.g., the second space 2201 in FIG. 3A), a bendable member 240 disposed in the second space 2201 to be at least partially rotatable, a flexible display 230 disposed to be supported by at least a portion of the bendable member 240 and the first housing 210, and a driving module configured to drive the first housing in a direction (e.g., the −y-axis direction) in which the first housing 210 is slid into the second housing 220 and/or a direction (e.g., the y-axis direction) in which the first housing 210 is slid out from the second housing 220. According to an embodiment, the drive module may include a drive motor 260 disposed in the first space 2101 and including a pinion gear 261 and a rack gear 2251 disposed to be meshed with a pinion gear 261 in the second space 2201. According to an embodiment, the drive module may further include a reduction module disposed to be coupled to the drive motor 260 to reduce a rotation speed and increase a drive force. According to an embodiment, the drive motor 260 may be disposed to be supported by at least a portion of the first support member 212 in the first space 2101 of the first housing 210. According to an embodiment, the drive motor 260 may be fixed to an end portion (e.g., an edge) of the first support member 212 in the slide-in direction (e.g., the −y-axis direction) in the first space 2101.

According to various embodiments, the electronic apparatus 200 may include multiple electronic components disposed in the first space 2101. According to an embodiment, the multiple electronic components may include a first substrate 251 (e.g., a main substrate), a camera module 216 disposed around the first substrate 251, a socket module 218 (e.g., a SIM tray), a speaker 207, a connector port 208, and a battery B. According to an embodiment, the multiple electronic components are disposed together with the drive motor 260 around the first substrate 251 in the first space 2101 of the first housing 210 and thus may allow effective electrical connection.

According to various embodiments, the electronic apparatus 200 may include a rear bracket 214 disposed to cover at least a portion of the multiple electronic components between the first support member 212 of the first housing 210 and the first rear cover 213. According to an embodiment, the rear bracket 214 may be structurally coupled to at least a portion of the first support member 212. In some embodiments, the rear bracket 214 may be omitted. According to an embodiment, the rear bracket 214 may be disposed to cover multiple electronic components and support the first rear cover 213. According to an embodiment, the rear bracket 214 may include a notch area or opening 214*a* (e.g., a through-hole) configured on an area corresponding to the second camera module 216 and/or a second module (e.g., the second sensor module 217 in FIG. 3B). According to an embodiment, the second camera module 216 and/or the second sensor module 217 may be disposed to detect the external environment through the notch area or opening 214*a*. According to an embodiment, the first rear cover 213 may include a transparent area corresponding at least to the second camera module 216 and/or the second sensor module 217. In some embodiments, the second camera module 216 and/or the second sensor module 217 may be configured to operate only when the electronic apparatus 200 is in the slide-out state.

According to various embodiments, the electronic apparatus 200 may include a support bracket 225 (e.g., a display support bar (DSB)), that is a plate-type support bracket, disposed in the second space 2201 of the second housing 220 and slidably coupled to at least a portion of the first support member 212. According to an embodiment, the support bracket 225 may include an opening 225*a* having a designated size. According to an embodiment, the support bracket 225 may include a support part 2252 disposed at one end thereof and including an external surface formed to be curved so as to support the rear surface of the bendable member 240 which is bent during a sliding operation. According to an embodiment, the support bracket 225 may include a support plate 2253 configured to extend from at least a portion of the support part 2252 to at least a portion of the opening 225*a* so as to support the rear surface of the bendable member 240 in the slide-out state. According to an embodiment, the support bracket 225 may include a rack gear 2251 passing through the opening 225*a* and fixed to have a length along a direction parallel with the sliding direction. In some embodiments, the rack gear 2251 may be integrally formed with the support bracket 225. According to an embodiment, the electronic apparatus 200 may include a pair of guide rails 226 disposed at both lateral surfaces of the support bracket 225 to guide both ends of the bendable member 240 in the sliding direction.

According to various embodiments, the second housing 220 may include an opening 222*a* (e.g., a through-hole) through the second support member 222 at an area corresponding to the second camera module 216 and/or the second sensor module 217 disposed in the first housing 210 when the electronic apparatus 200 is in the slide-in state. According to an embodiment, the second camera module 216 and/or the second sensor module 217 may detect the external environment through the opening 222*a* formed on the second housing 220 when the electronic apparatus 200 is in the slide-in state. In this case, the second rear cover 223 may include a transparent area corresponding at least to the second camera module 216 and/or the second sensor module 217.

According to various embodiments, the electronic apparatus 200 may include a second substrate 252 and an antenna member 253 disposed in a space between the second support member 222 and the second rear cover 223 of the second housing 220. According to an embodiment, the second substrate 252 and the antenna member 253 may be electrically connected to the first substrate 251 through at least one electrical connection member (e.g., a flexible printed circuit board (FPCB) or a flexible RF cable (FRC)). In some embodiments, the antenna member 253 may be electrically connected to the second substrate 252, and, through the second substrate 252, electrically connected to the first substrate 251.

Figure 5:
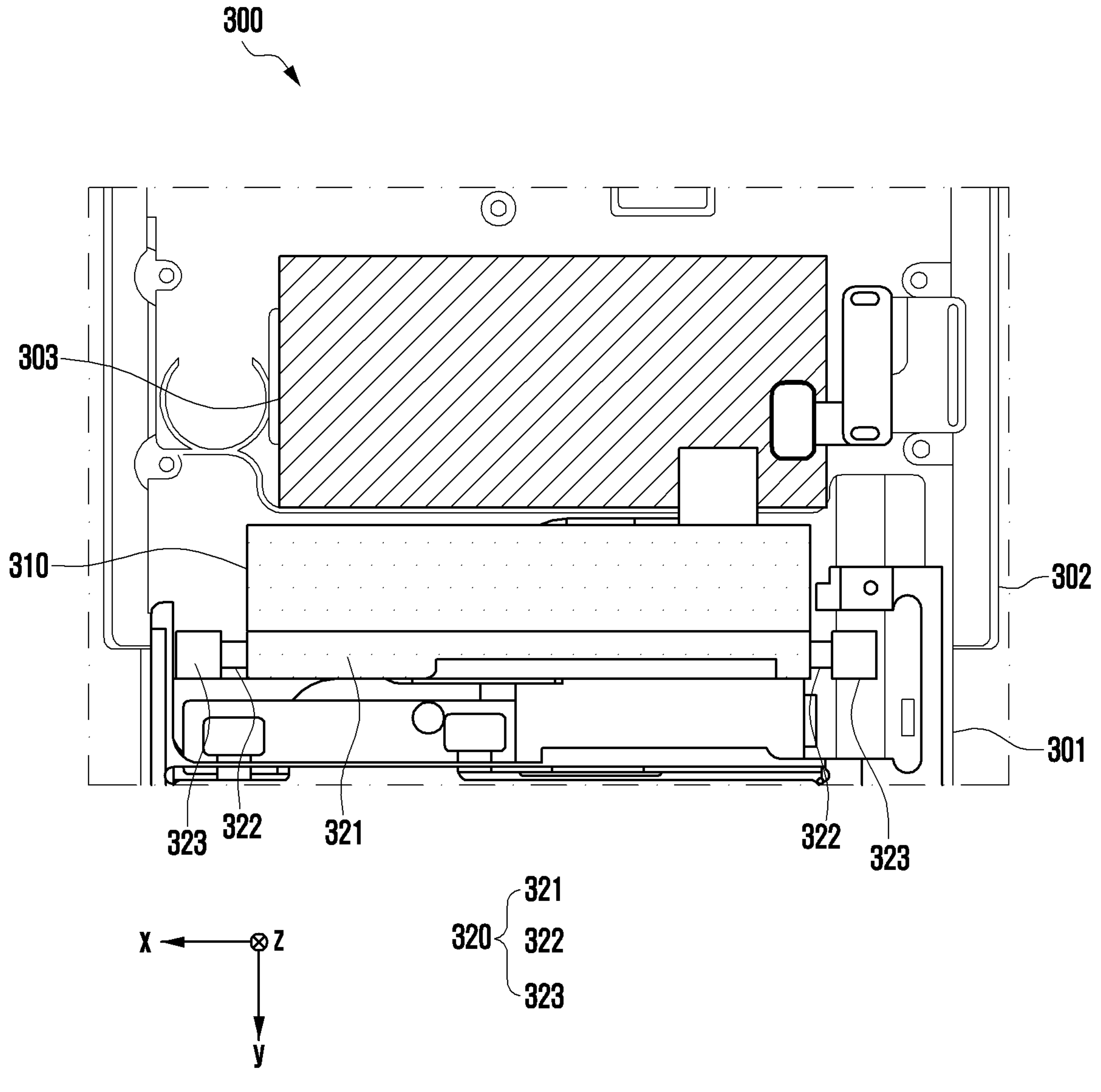
FIG. 5 is an internal planar view illustrating an interior of an electronic apparatus according to various embodiments of the present disclosure.

FIG. 5 is an internal planar view illustrating an interior of an electronic apparatus 300 according to various embodiments of the present disclosure.

Figure 6A:
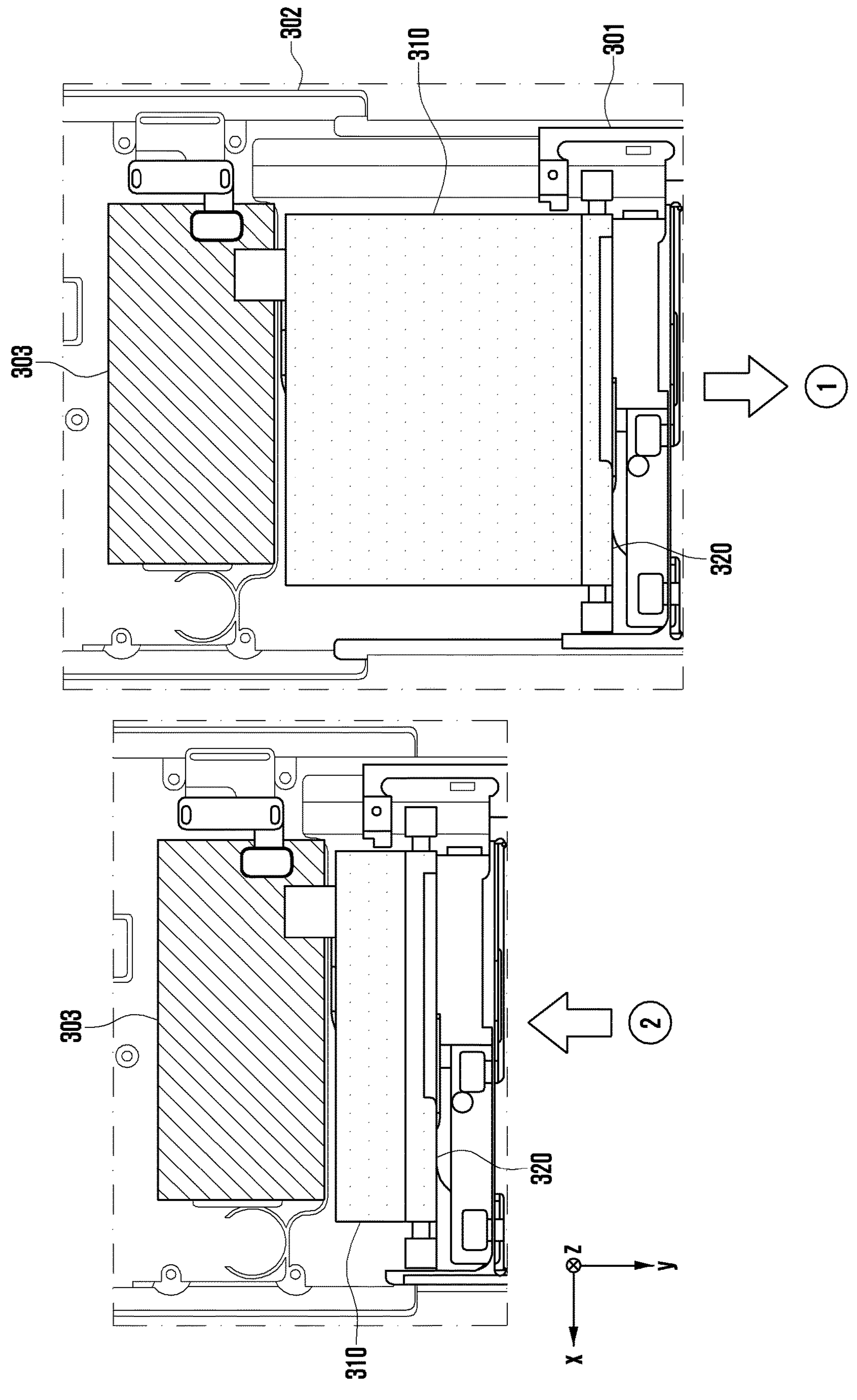
FIG. 6A is an internal planar view illustrating an operation in which a first housing of an electronic apparatus slides with respect to a second housing according to various embodiments of the present disclosure.

FIG. 6A is an internal planar view illustrating an operation in which a first housing 301 of an electronic apparatus 300 slides with respect to a second housing 302 according to various embodiments of the present disclosure.

Figure 6B:
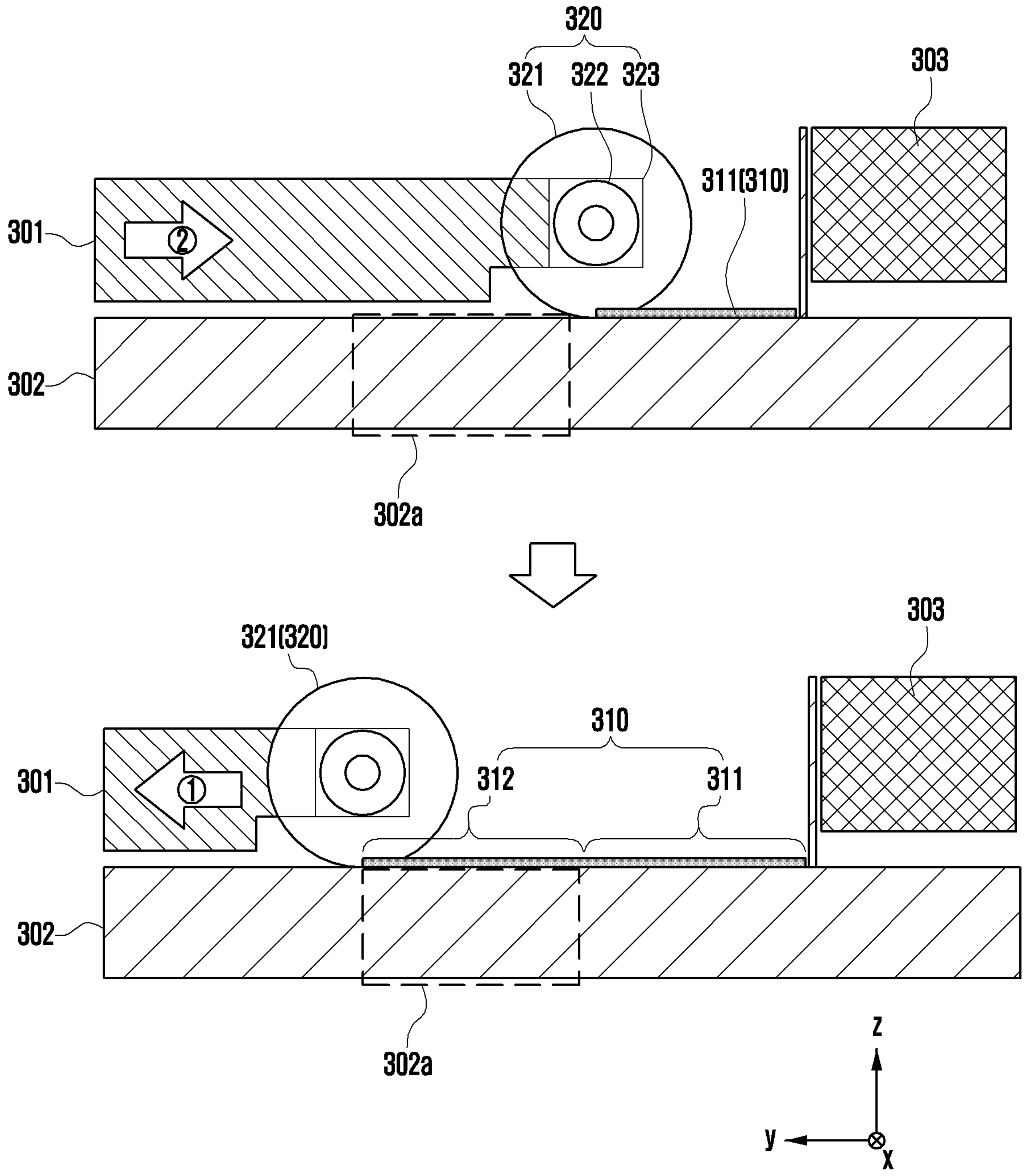
FIG. 6B is a lateral view illustrating an operation in which a first housing of an electronic apparatus slides with respect to a second housing according to various embodiments of the present disclosure.

FIG. 6B is a lateral view illustrating an operation in which a first housing 301 of an electronic apparatus 300 slides with respect to a second housing 302 according to various embodiments of the present disclosure.

FIG. 5 and FIGS. 6A and 6B are planar views illustrating an inside of an area corresponding to portion A in FIGS. 2A and 2B.

Referring to FIGS. 5A, 6A, and 6B, the electronic apparatus 300 (e.g., the electronic apparatus 200 in FIGS. 2A to 4) may include a first housing 301 (e.g., the first housing 210 in FIGS. 2A to 4), a second housing 302 (e.g., the second housing 220 in FIGS. 2A to 4), a heat transfer sheet 310, and a roller 320.

The second housing 302 may include an internal space, and the first housing 301 may be slidably coupled to the second housing 302 and slid out in a first direction ① (e.g., the y direction) with respect to the internal space of the second housing 302 or slid in in a second direction ② (e.g., the −y direction) opposite to the first direction ①). A heat generation source 303 may be disposed in at least one of the first housing 301 or the second housing 302. The heat generation source 303 may correspond to a component, such as an application processor (AP), a modem, a battery, a display, a power management IC (PMIC), and/or a motor for sliding the electronic apparatus 300, and a component that generates heat when the electronic apparatus 300 operates, such as a printed circuit board on which the aforementioned components are disposed.

The roller 320 may be disposed in at least one of the first housing or the second housing 302, and may have a rotation shaft oriented in a direction (e.g., the x-axis direction) perpendicular to the first and second directions. The roller 320 may be rotated around the rotation shaft to wind or unwind the heat transfer sheet 310 which will be described below. The roller 320 may unwind the heat transfer sheet 310 when the second housing 302 is slid out by relatively sliding in the first direction with respect to the first housing 301, and wind the heat transfer sheet 310 when the second housing is slid in by relatively sliding in the second direction. The detailed configuration of the roller 320 will be described below.

The heat transfer sheet 310 may be a plate-shaped or film-shaped member including a material with high thermal conductivity, such as an artificial or natural graphite sheet.

The heat transfer sheet 310 may be a member that lowers the temperature of the heat generation source 303 by dispersing heat generated from the heat generation source 303 over a larger area than the heat generation source 303. One end portion of the heat transfer sheet 310 may be fixed to the roller 320, and may be wound and unwound by the roller 320 as the roller 320 rotates. The other end portion of the heat transfer sheet 310 may be disposed in an area adjacent to the heat generation source 303. The detailed configuration of the heat transfer sheet 310 will be described below.

Figure 7A:
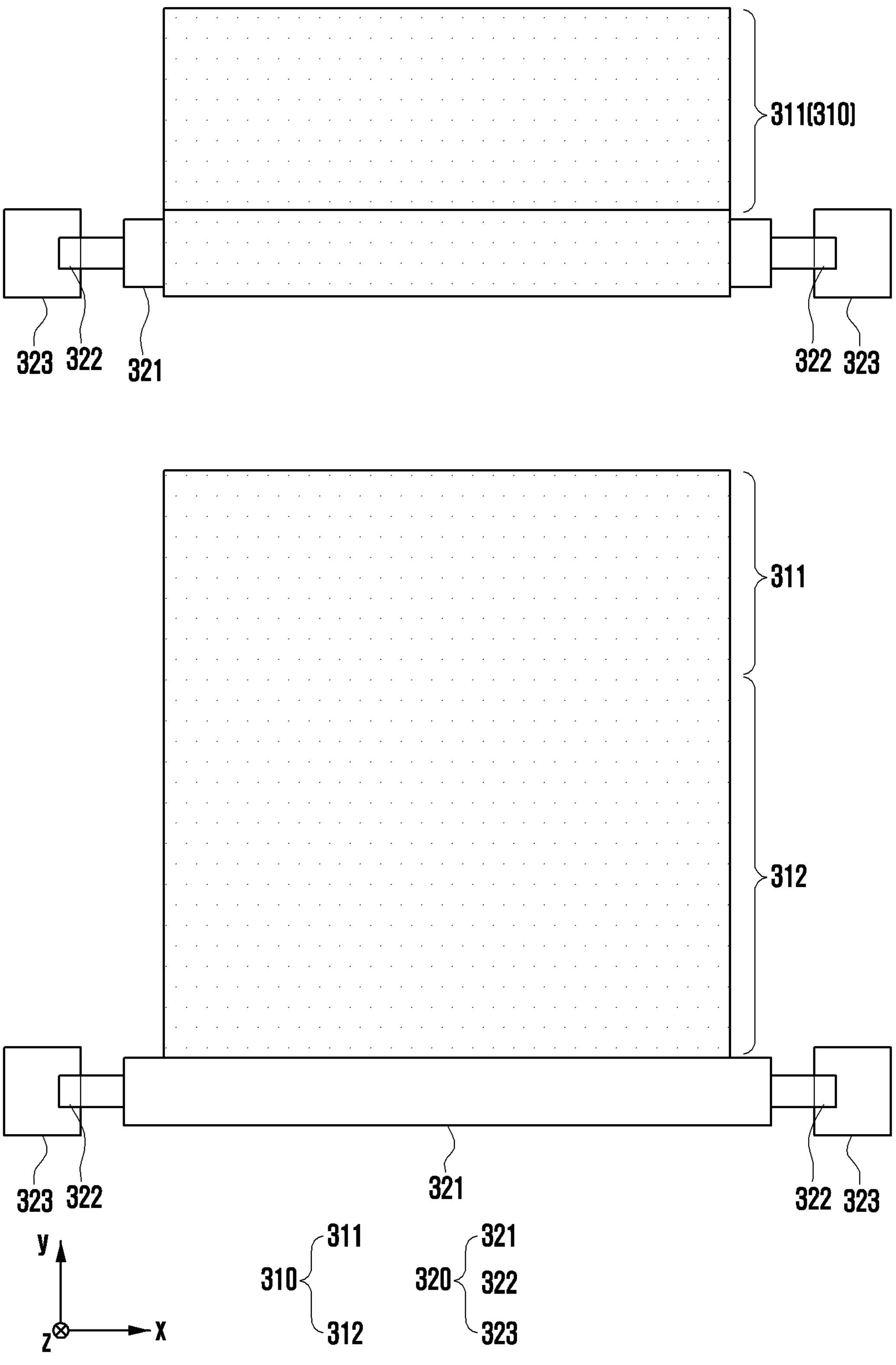
FIG. 7A is a planar schematic view illustrating a heat transfer sheet and a winding and unwinding state of a roller of an electronic apparatus according to various embodiments of the present disclosure.

FIG. 7A is a planar schematic view illustrating a heat transfer sheet 310 and a winding and unwinding state of a roller 320 of an electronic apparatus 300 according to various embodiments of the present disclosure.

FIG. 7A is a lateral schematic view illustrating a heat transfer sheet 310 and a winding and unwinding state of a roller 320 of an electronic apparatus 300 according to various embodiments of the present disclosure.

Figure 7B:
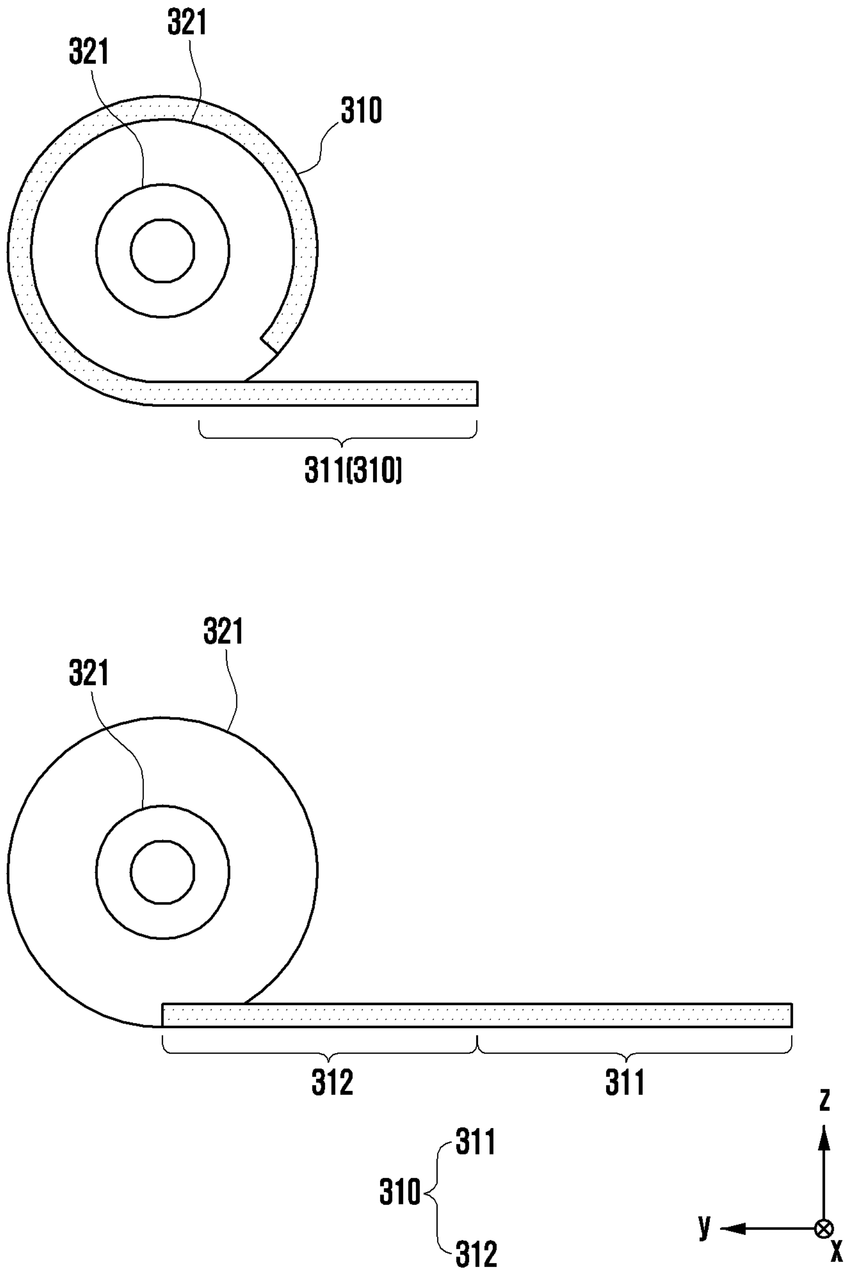
FIG. 7B is a lateral schematic view illustrating a heat transfer sheet and a winding and unwinding state of a roller of an electronic apparatus according to various embodiments of the present disclosure.

In FIG. 7B, a chock unit 323 is omitted for clarity.

Referring to FIG. 7A, the roller 320 may include a body unit 321, a journal unit 322, and a chock unit 323. The body unit 321 may correspond to a portion on which the heat transfer sheet 310 is wound and may have a cylindrical shape. The journal units 322 may be located at both ends of the body unit 321, and in some embodiments, a diameter of the journal units 322 may be smaller than that of the body unit 321. The chock unit 323 may correspond to a member configured to surround at least a portion of an outer circumference of the journal units 322. The chock unit 323 may correspond to a member that supports the rotation of the roller 320 by supporting the journal units 322, and in some embodiments, the chock may include a bearing configured to support the journal units 322 and reduce rotational friction of the journal units 322, for example, a ball bearing, a roller bearing and/or a sleeve bearing. The chock unit 323 including a bearing may be referred to as a bearing case. In some embodiments, multiple chock units 323 may respectively support multiple journal units 322 disposed at both ends of the body unit 321. In another embodiment, the journal unit 322 disposed at one end of the body unit 321 may be supported by the chock unit 323 and the journal unit 322 disposed at the other end may be supported by another member. The description thereof will be given below.

Referring to FIGS. 7A and 7B, the heat transfer sheet 310 may include a fixed portion 311 and an extension portion 312. The fixed portion 311 may be a portion fixed to at least one of the first housing 301 or the second housing 302. The fixed portion 311 may be a portion not wound around the roller 320 in a state in which the second housing 302 is completely slid in with respect to the first housing 301. The extension portion 312 may be a portion wound around the roller 320 when the second housing 302 is slide in with respect to the first housing 301 and unwound from the roller 320 in case of sliding out.

Referring again to FIG. 6B, in various embodiments, with respect to the heat transfer sheet 310, the fixed portion 311 may be fixed to the second housing 302. The fixed portion 311 may be attached to a portion of the second housing 302, adjacent to the heat generation source 303 disposed in the second housing 302. In various embodiments, an adhesive material, such as a pressure-sensitive adhesive (PSA) or a heat-conducting adhesive, may be disposed between the fixed portion 311 and the second housing 302 so that the fixed portion 311 may be fixed to the second housing 302. In some embodiments, a thermal interface material (TIM), which is a layer configured to reduce thermal resistance by filling a gap between the fixed portion 311 and the second housing 302 may be disposed between the fixed portion 311 and the second housing 302. In some embodiments, the extension portion 312 may be disposed on an area 302*a* of the second housing 302 overlapping the first housing 301 when the first housing 301 slides in a second direction (e.g., the −y direction) on the second housing 302. Therefore, when the first housing 301 is slid out, the heat transfer sheet 310 is disposed in the above-described area 302*a* to disperse the heat of the heat generation source 303 to the second housing 302, and when the first housing 301 is slid in, the heat transfer sheet 310 is wound to cause the heat transfer sheet 310 not to be disposed between the first housing 301 and the second housing 302, so that a spacing in a thickness direction (the z-axis direction) between the first housing 301 and the second housing 302 may be reduced and the thickness of the electronic apparatus 300 may be reduced. In addition, in case that the first housing 301 is in the slide-in state, an area and resolution of a display (e.g., the flexible display 230 in FIGS. 2A to 4) may be reduced and an amount of heat generated from the heat generation source 303, for example, an application processor (AP) may be reduced. In some embodiments, the heat transfer sheet 310 wound around the roller 320 may function as a heat sink.

In another embodiment, it will be apparent to those skilled in the art that, with respect to the heat transfer sheet 310, the fixed portion 311 may be also fixed to the first housing 301, and the extension portion 312 may be also disposed on an area 302*a* on the first housing 301, which overlaps the second housing 302 when the first housing 301 slides in the second direction (e.g., the −y direction).

Figure 8A:
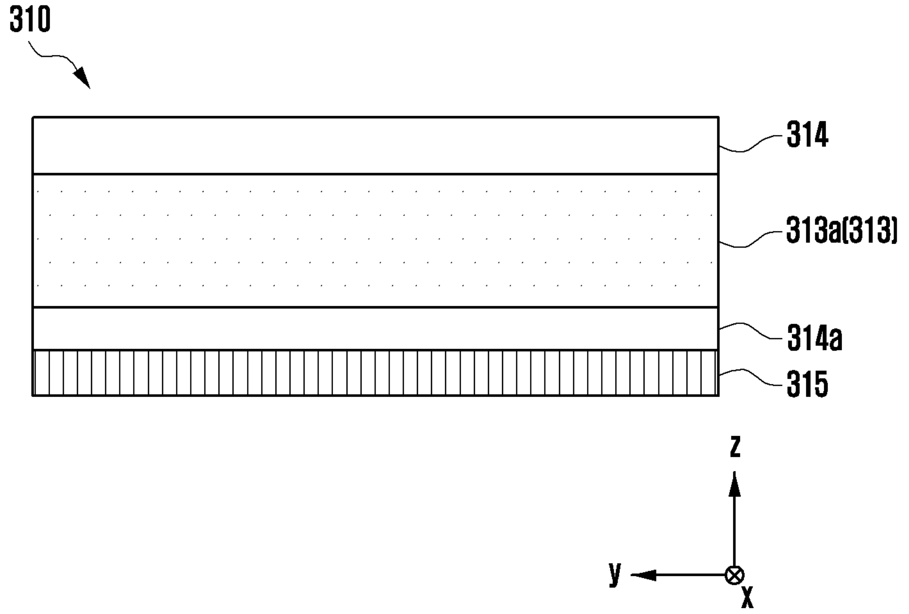
FIGS. 8A and 8B are sectional views illustrating a heat transfer sheet according to some embodiments of the present disclosure.

FIG. 8A is a sectional view illustrating a heat transfer sheet 310 according to some embodiments of the present disclosure.

Figure 8B:
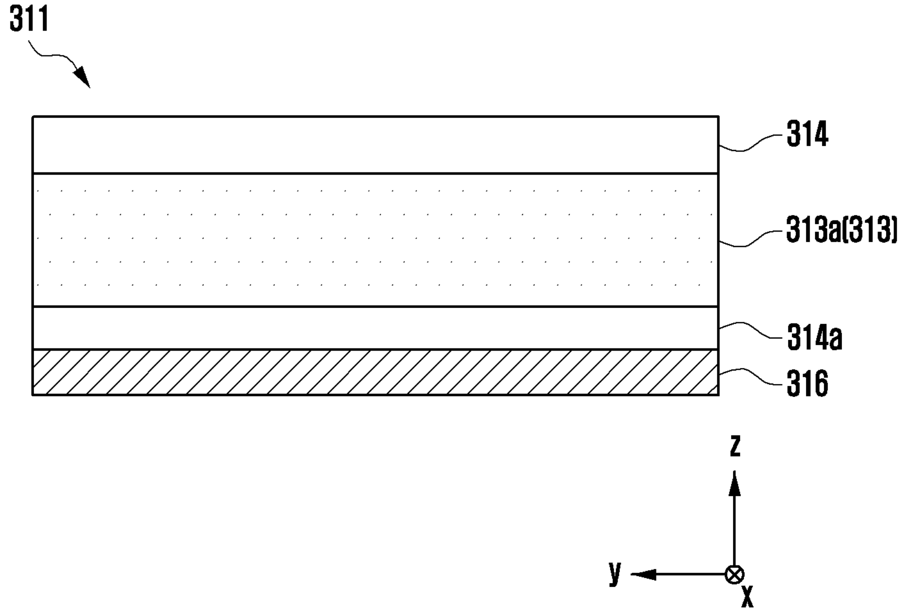

FIG. 8B is a sectional view illustrating a fixed portion of a heat transfer sheet 310 according to some embodiments of the present disclosure.

Referring to FIG. 8A, the heat transfer sheet 310 of the present disclosure may include a heat conduction layer 313 and a protection layer 314 disposed on at least one surface of the heat conduction layer 313. The heat conduction layer 313 may include a material with high thermal conductivity, such as a graphite sheet 313*a*.

In some embodiments, the heat conduction layer 313 may include the graphite sheet 313*a* manufactured by impregnating a material such as pitch into porous natural or artificial graphite and rolling same. In another embodiment, the graphite sheet 313*a* may be obtained by carbonizing a polymer fabric such as polyimide. In still another embodiment, the graphite sheet 313*a* may include multiple graphene layers oriented in a flat shape. Since the various graphite sheets 313*a* have orientation, the heat conduction layer 313 and the heat transfer sheet 310 may have relatively high heat conductivity with respect to a plane direction.

The protection layer 314 may correspond to a member disposed to protect the heat conduction layer 313 from external shock or damage and prevent a material included in the heat transfer sheet 310, for example, graphite from being separated from the heat transfer sheet 310 and causing malfunctions such as short circuits and ground faults within the interior of the electronic apparatus 300. In order to effectively reinforce the heat transfer sheet 310 that is repeatedly wound and unwound, it may be preferable that the protection layer 314 has a relatively thick thickness compared to a protection layer 314 of a conventional heat transfer sheet 310. In some embodiments, the protection layer 314 may have a relatively low elastic modulus to reduce a stress caused by repeated winding and unwinding and a large thickness thereof. For example, in some embodiments, the elastic modulus of the protection layer 314 may be 2.7 GPa or less. In case that the elastic modulus exceeds 2.7 GPa, there is a risk that the protection layer 314 may be damaged due to excessive stress generated by bending during winding and fatigue due to repeated winding and unwinding. The protection layer 314 may be located on at least one of an upper (the z-axis direction) surface or a lower (opposite to the z-axis direction) surface of the heat conduction layer 313. In various embodiments, the protection layer 314*a* located on a lower portion of the heat conduction layer 313 may have a thickness smaller than that of the protection layer 314 located on an upper portion.

In some embodiments, the heat transfer sheet 310 may include a vertical heat transfer layer 315. As described above, the heat conduction layer 313, for example, the graphite sheet 313*a*, may have a relatively high thermal conductivity in the plane direction and a relatively low thermal conductivity in the thickness direction (the z-axis direction). Therefore, the heat transfer sheet 310 may include the vertical heat transfer layer 315 having a relatively high thermal conductivity in the thickness direction to lower heat resistance with respect to a heat transfer path configured to emit or absorb heat from a surface of the heat transfer sheet 310. In some embodiments, the vertical heat transfer layer 315 may be disposed on a surface of the heat transfer sheet 310 where the heat transfer sheet 310 faces at least one of the first housing 301 or the second housing 302. In some embodiments, the vertical heat transfer layer 315 may include a matrix such as silicone or acrylic polymer and a thermally conductive material (e.g., a graphite fiber) oriented in a vertical direction and dispersed within the matrix. Furthermore, in some embodiments, the vertical heat transfer layer 315 may be adhesive on a surface of the first or second housing 302, and thus remove a void present between the heat transfer sheet 310 and the first or second housing 302 so as to additionally reduce thermal resistance.

Figure 9A:
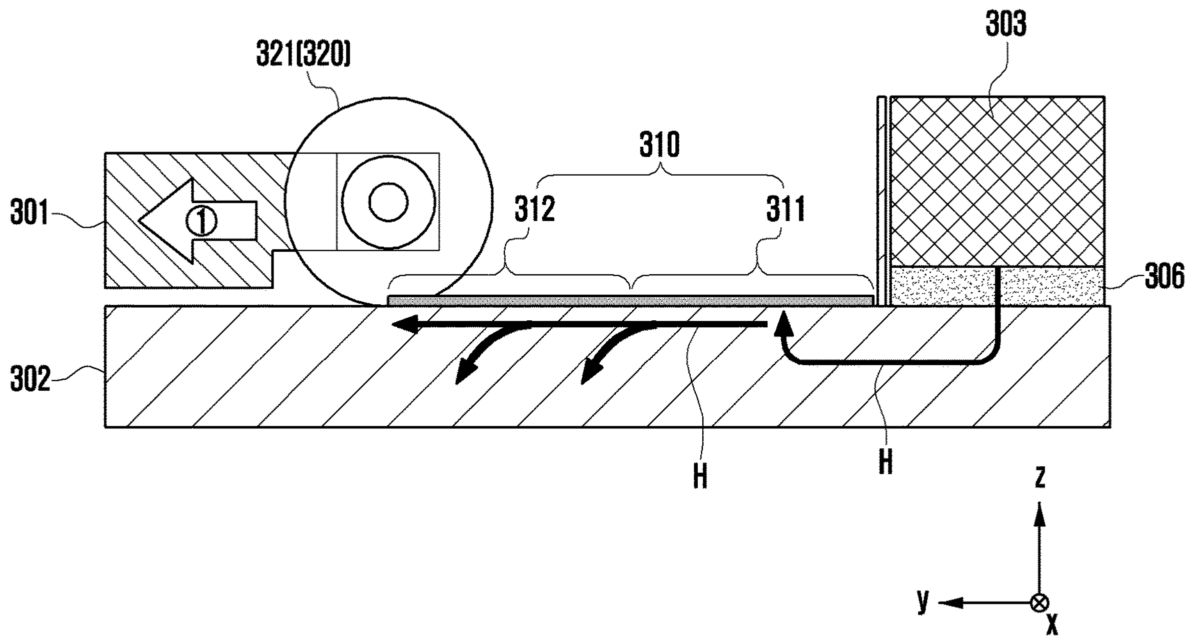
FIGS. 9A and 9B are sectional views illustrating a heat transfer structure of a heat transfer sheet from a heat generation source according to various embodiments of the present disclosure.
Figure 9B:
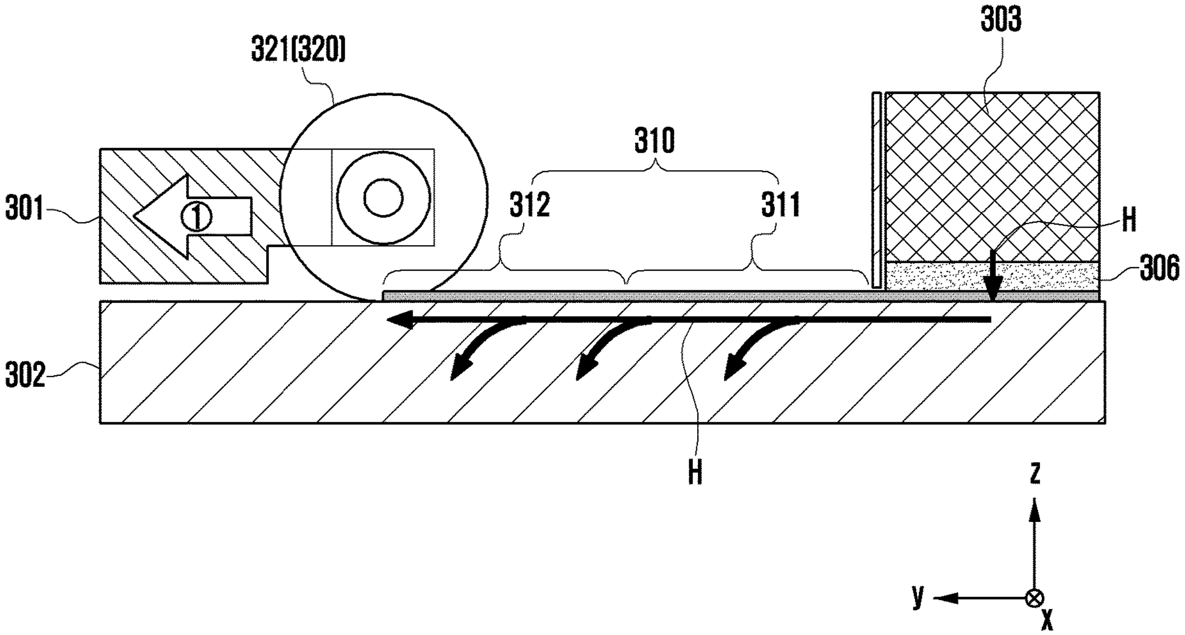

Referring to FIG. 8A, the fixed portion 311 may include a heat conduction layer 313, a protection layer 314, and an adhesive layer 316. Regarding the heat conduction layer 313 and the protection layer 314, reference may be made to the description of FIG. 8A as long as there is no conflict. The adhesive layer 316 may correspond to a member which includes an adhesive and fixes the fixed portion 311 of the heat transfer sheet 310 to the first housing 301 or the second housing 302. The adhesive layer 316 may include an adhesive, such as a pressure sensitive adhesive (PSA) and/or a thermally conductive adhesive. FIGS. 9A and 9B are sectional views illustrating a heat transfer structure of a heat transfer sheet from a heat generation source according to various embodiments of the present disclosure.

Referring to FIG. 9A, heat H generated from the heat generation source 303 may be transferred to the second housing 302. In various embodiments, a thermal interface 306 may be disposed between the heat generation source 303 and the second housing 302. The thermal interface 306 may include, for example, a thermal paste, a thermal pad, or the like. The heat H transferred to the second housing 302 may be transferred from the second housing 302 to the fixed portion 311 of the heat transfer sheet 310. The heat transfer sheet 310 may transfer the heat H received through the fixed portion 311 to be quickly transferred to a larger area of the second housing 302, so that the heat H of the heat generation source 303 may be quickly distributed over the larger area of the second housing 302.

In addition, since an area of the fixed portion 311 is relatively larger than an area of the heat generation source 303, a material having relatively lower thermal conductivity than a material of the thermal interface 306 disposed between the heat generation source 303 and the second housing 302 may be used for an adhesive for fixing the fixed portion 311. For example, an adhesive such as a PSA or a thermally conductive adhesive may effectively fix the fixed portion 311, but may have a lower thermal conductivity than a thermal paste generally used for the thermal interface 306. However, since a heat transfer area from the second housing 302 to the fixed portion 311 is large, the fixed portion 311 may effectively receive the heat H generated from the heat generation source 303 even if the adhesive layer has a relatively low heat conductivity.

Referring to FIG. 9B, the heat transfer sheet 310 may at least partially extend to an area where the heat generation source 303 and the second housing 302 overlap. The heat transfer sheet 310 may be in contact with the heat generation source 303 directly or indirectly through the thermal interface 306 disposed therebetween. One surface of the fixed portion 311 of the heat transfer sheet 310 may be fixed with respect to the second housing 302 and the other surface thereof may be in contact with the heat generation source 303. Since the heat transfer sheet 310 extends to contact the heat generation source 303, the heat H may be effectively transferred from the heat generation source 303 to the heat transfer sheet 310.

Figure 10A:
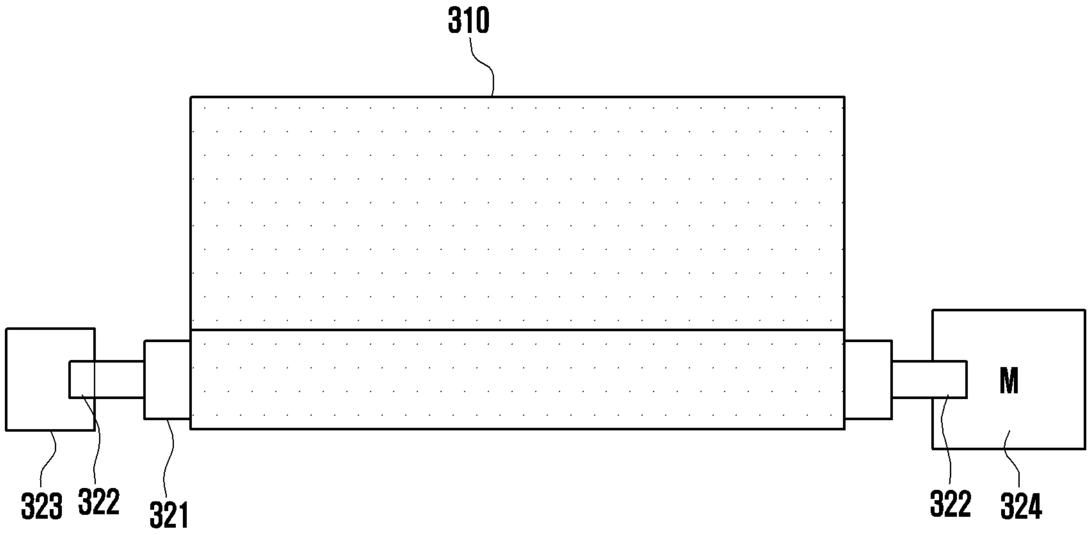
FIG. 10A is a planar view illustrating a roller and a heat transfer sheet of the present disclosure.

FIG. 10A is a planar view illustrating a roller 320 and a heat transfer sheet 310 of embodiments of the present disclosure.

Figure 10B:
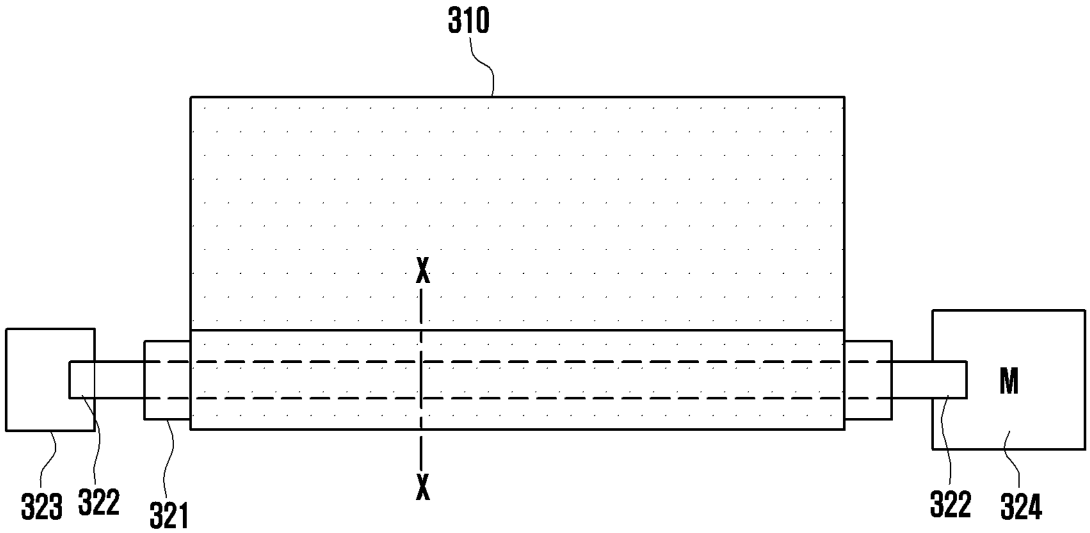
FIG. 10B is a planar view illustrating a roller and a heat transfer sheet according to other embodiments of the present disclosure.

FIG. 10B is a planar view illustrating a roller 320 and a heat transfer sheet 310 according to other embodiments of the present disclosure.

Figure 10C:
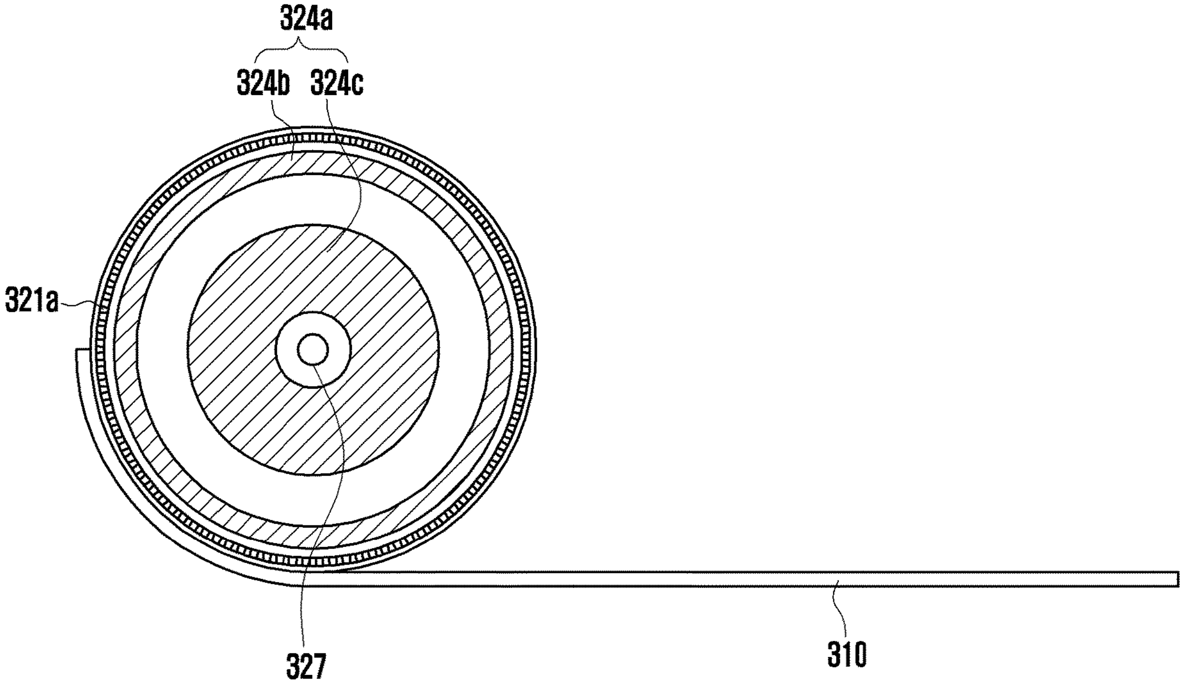
FIG. 10C is a sectional view illustrating a roller according to other embodiments of the present disclosure.

FIG. 10C is a sectional view illustrating a roller 320 according to other embodiments of the present disclosure.

The cross section in FIG. 10C is a cross section taken in the X-X direction of FIG. 10B.

Referring to FIG. 10A, the roller 320 may be driven by a motor 324. The motor 324 is linked to sliding movement between the first housing 301 and the second housing 302 and may wind or unwind the heat transfer sheet 310 by rotating the roller 320. One of multiple journal units 322 located at both ends of the body unit 321 of the roller 320 may be supported by the chock unit 323, and the other may be supported by the motor 324. Therefore, a space for arranging a portion of the chock unit 323 may be saved.

Referring to FIGS. 10B and 10C, the roller 320 may include a built-in motor 324*a*. The built-in motor 324*a* may include a stator 324*c* fixed with respect to an axis (e.g., corresponding to the internal shaft 327) of the roller 320 and a rotor 324*b* fixed with respect to an external body 321*a* of the roller 320, so as to be extended through the roller 320. The built-in motor 324*a* may rotate the external body 321*a* of the roller 320 by having the stator 324*c* fixed by a motor mount 324*d* and rotating the rotor 324*b*. By embedding the built-in motor 324*a* in the roller 320, the heat transfer sheet 310 may more effectively dissipate the heat H generated to drive the roller 320 to the outside. In addition, since the stator 324*c* is fixed, the motor mount 324*d* does not need to include a bearing, unlike the chock unit 323, and may have a smaller size than the chock unit 323, thereby saving space.

Figure 11:
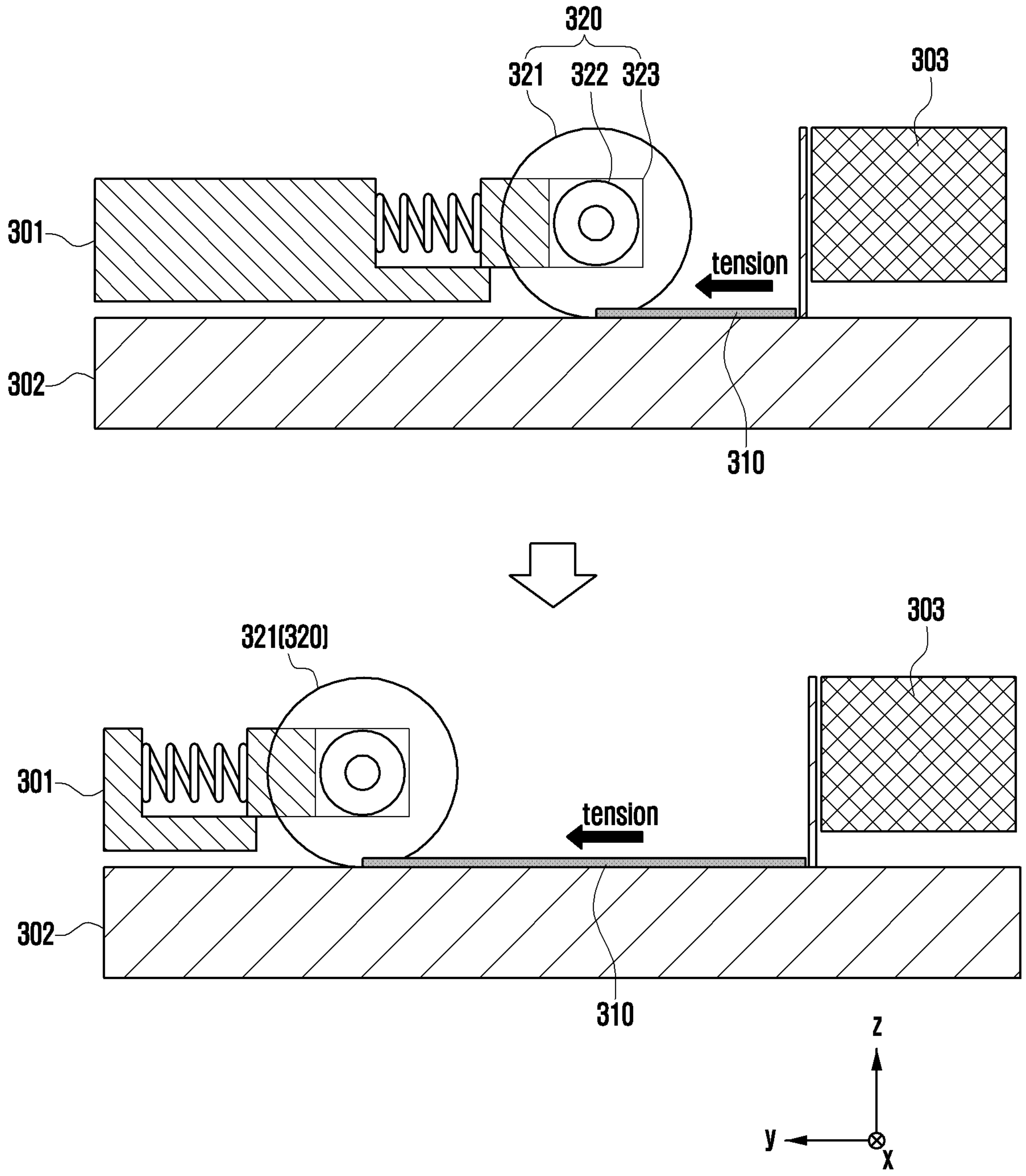
FIG. 11 is a view illustrating a roller of an electronic apparatus according to some embodiments of the present disclosure.

FIG. 11 is a view illustrating a roller 320 of an electronic apparatus 300 according to some embodiments of the present disclosure.

Figure 12:
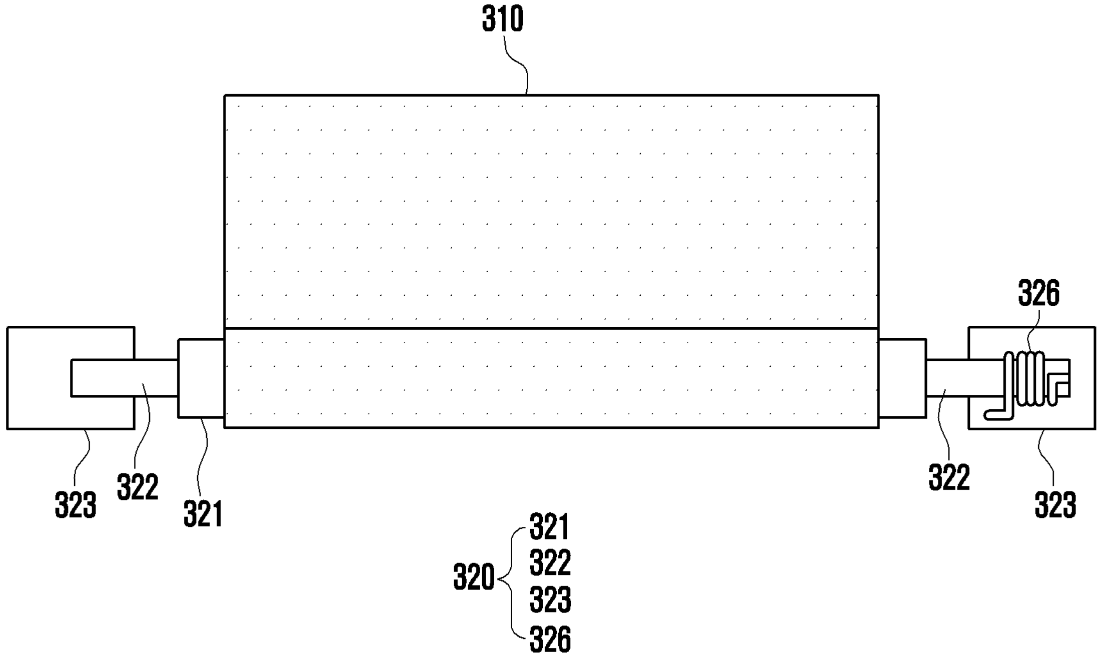
FIG. 12 is a view illustrating a roller of an electronic apparatus according to other embodiments of the present disclosure.

FIG. 12 is a view illustrating a roller 320 of an electronic apparatus 300 according to other embodiments of the present disclosure.

Figure 13:
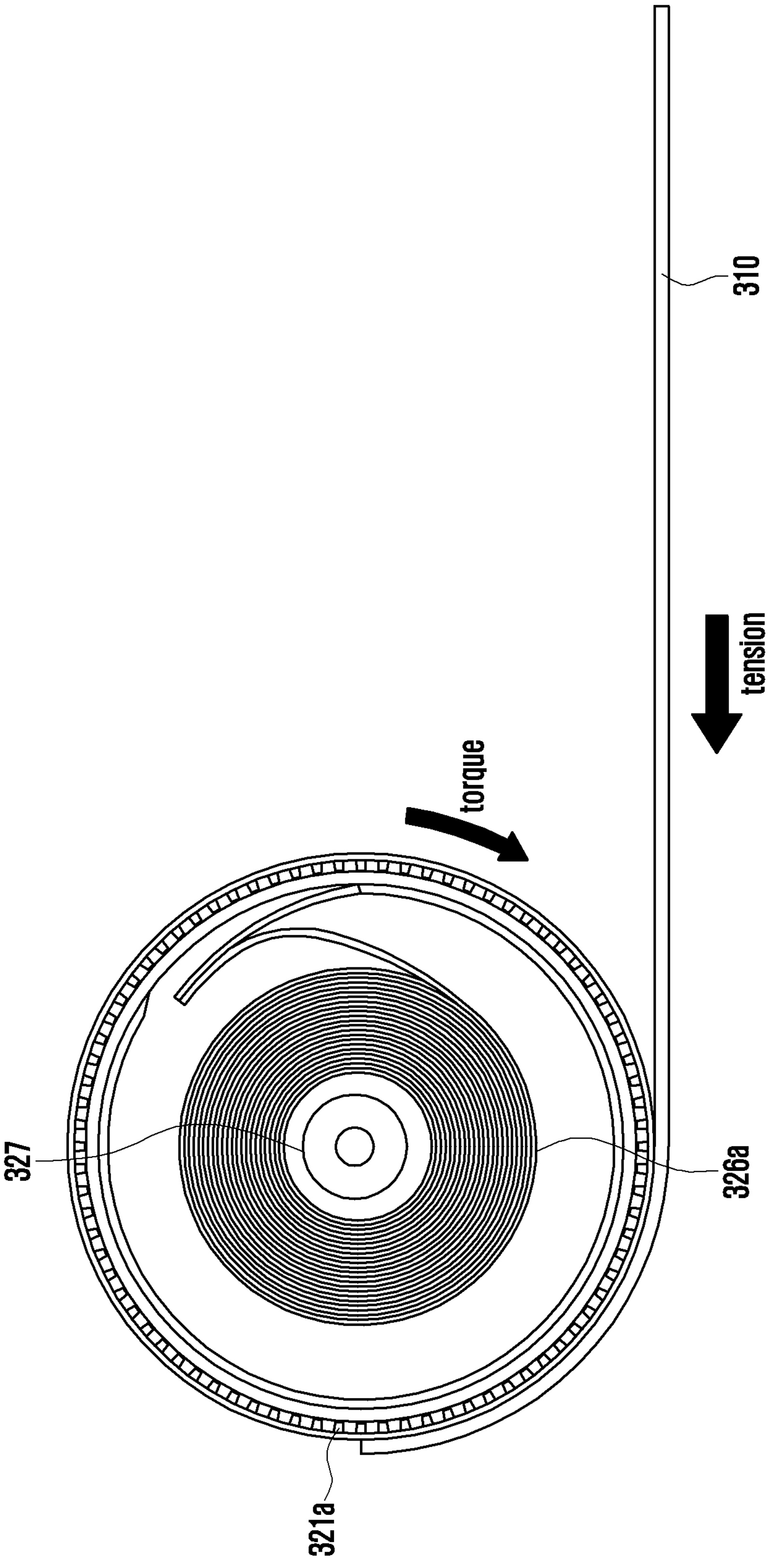
FIG. 13 is a view illustrating a roller of an electronic apparatus according to still other embodiments of the present disclosure.

FIG. 13 is a view illustrating a roller 320 of an electronic apparatus 300 according to still other embodiments of the present disclosure.

Referring to FIG. 11, in some embodiments, the roller 320 may receive a force in a first direction (the y direction) by an elastic member 325, and the heat transfer sheet 310 may receive tension by the roller 320. In some embodiments, the heat transfer sheet 310 may be fixed with respect to the first housing 301, and the elastic member 325 may be disposed between the roller 320 and the chock unit 323 of the second housing 302, wherein the elastic member 325 may apply a force in the first direction with respect to the chock unit 323, thereby applying a force in the first direction on the roller 320 and a tension in the first direction on the heat transfer sheet 310. The elastic member may include, for example, a coil spring and the like.

Although FIG. 11 shows the embodiment in which the elastic member 325 is located in the first direction (the y direction) with respect to the chock unit 323, and the force is applied to the chock unit 323 in the first direction by the tension of the elastic member 325, the present disclosure is not limited thereto, and it will be apparent to those skilled in the art that an embodiment in which the elastic member 325 may be located in a second direction (the y direction) with respect to the chock unit 323 and the chock may receive a force in the first direction by a compressive force of the elastic member 325.

The flatness of the heat transfer sheet 310 may decrease when winding and unwinding is repeated, and an error may occur between a rotation amount of the roller 320 for unwinding the heat transfer sheet 310 and a movement amount of the first housing 301. Therefore, an air gap may be generated between the heat transfer sheet 310 and an area (e.g., the first housing 301) configured to receive heat from the heat transfer sheet 310, and the air gap may increase thermal resistance in a direction perpendicular to a surface of the heat transfer sheet 310. Accordingly, a heat transfer ability from the heat transfer sheet 310 to the area in surface contact with the heat transfer sheet 310 may be reduced. The elastic member 325 applies a force to the roller 320 to apply tension to the heat transfer sheet 310, thereby increasing the flatness of the heat transfer sheet 310, reducing thermal resistance due to the air gap, and improving the heat dissipation ability of the electronic apparatus 300.

Referring to FIG. 12, in other embodiments, at least one of the chock unit 323 may include a rotation elastic member 326. The rotation elastic member 326 may correspond to a member configured to apply a rotational force (torque) having a rotational direction to wind the heat transfer sheet 310 with respect to the journal unit 322 of the roller 320. The rotation elastic member 326 may include, for example, a torsion bar or a torsion coil spring. As the rotation elastic member 326 applies a rotational force to the roller 320, the roller 320 applies a tension to the heat transfer sheet 310 to increase the flatness of the heat transfer sheet 310 and improve the heat dispersion ability.

Referring to FIG. 13, in other embodiments, the roller 320 may apply the rotation elastic member 326 that applies a rotational force having a rotational direction to wind the heat transfer sheet 310 around the roller 320. In some embodiments, the roller 320 may include an external body 321*a*, an internal shaft 327, and a rotation elastic member 326. The external body 321*a* may have an interior space and correspond to a part rotating to cause the heat transfer sheet 310 to be wound therearound along an outer circumference direction. The internal shaft 327 may be a fixed member with respect to the rotation of the external body 321*a*. The rotation elastic member 326 may correspond to a member fixed with respect to the external body 321*a* and the internal shaft 327 and configured to apply a rotational force having a rotational direction to wind the heat transfer sheet 310 with respect to the external body 321*a*. The rotation elastic member 326 may include a spiral torsion spring 326*a*, such as a mainspring. As the rotation elastic member 326 applies a rotational force to the roller 320, the roller 320 applies a tension to the heat transfer sheet 310 to increase the flatness of the heat transfer sheet 310. In addition, the rotation elastic member 326 is disposed inside the roller 320 to save an internal space of the electronic apparatus 300 required for disposition of the rotation elastic member 326.

Figure 14A:
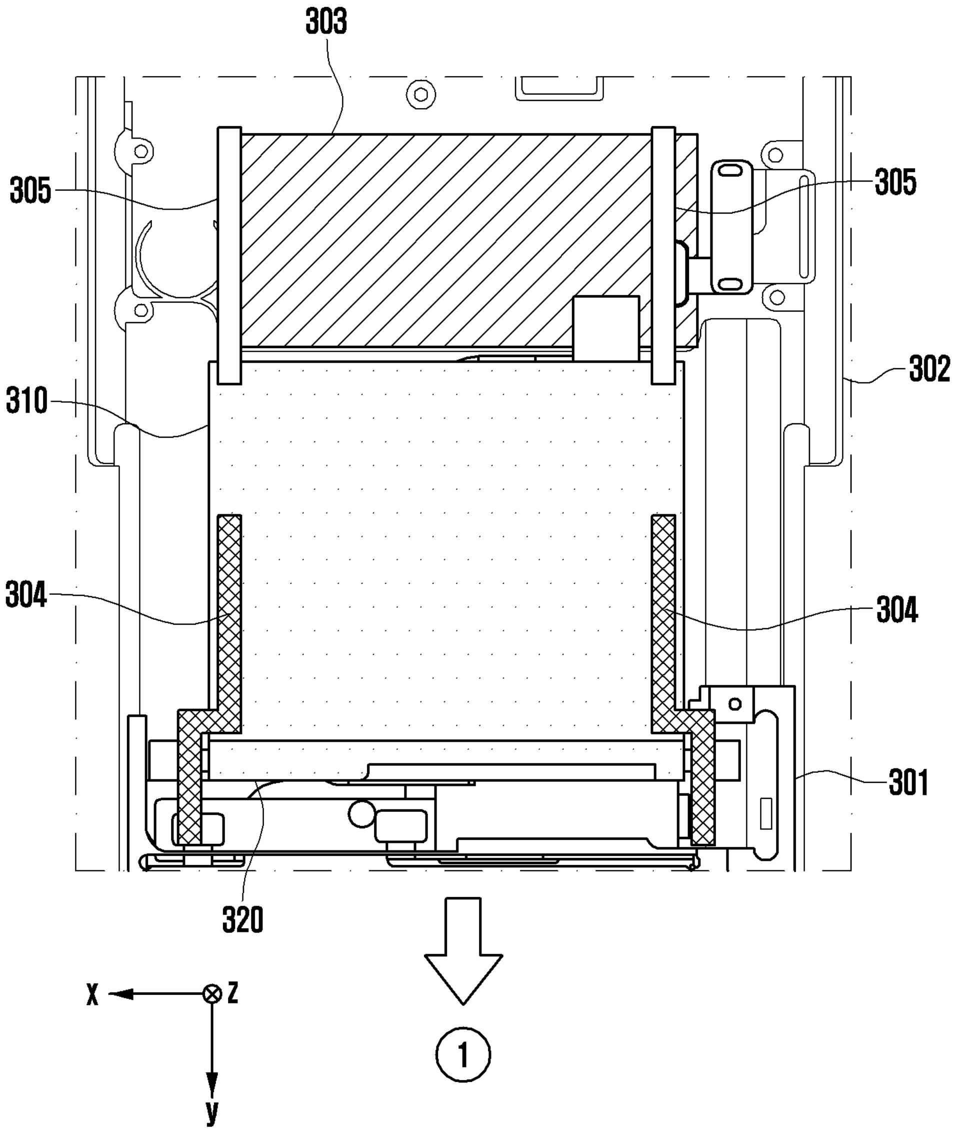
FIG. 14A is a planar view illustrating an electronic apparatus according to some embodiments of the present disclosure.

FIG. 14A is a planar view illustrating an electronic apparatus 300 according to some embodiments of the present disclosure.

Figure 14B:
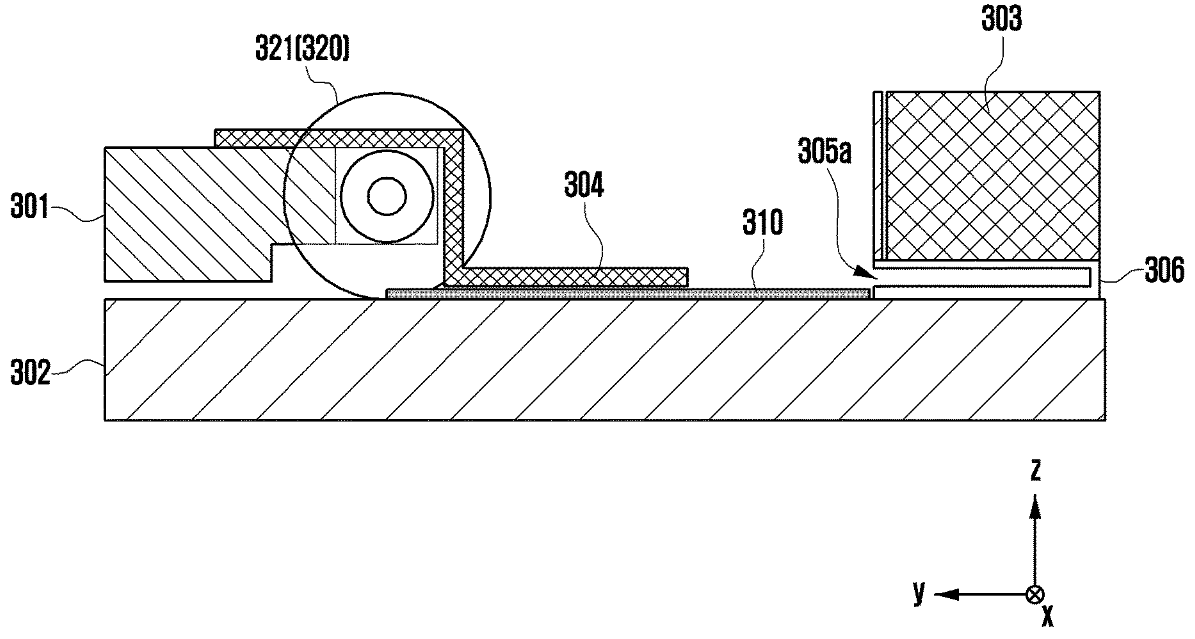
FIG. 14B is a lateral view illustrating an electronic apparatus according to some embodiments of the present disclosure.

FIG. 14B is a lateral view illustrating an electronic apparatus 300 according to some embodiments of the present disclosure.

Referring to FIGS. 14A and 14B, the electronic apparatus 300 according to some embodiments may include a guide member 304. The guide member 304 may correspond to a member located on a shoulder of the heat transfer sheet 310, that is, an area of the heat transfer sheet 310 adjacent to a lateral direction (the x and −x direction) edge and configured to guide the heat transfer sheet 310 to maintain the flat shape when the heat transfer sheet 310 is wound and unwound. The guide member 304 may slide in engagement with the roller 320. For example, the roller 320 and the guide member 304 may be disposed in the first housing 301 and may move together when the first housing 301 slides. The guide member 304 may maintain the flat shape of the heat transfer sheet 310, thereby preventing deformation, such as bending or curling of the heat transfer sheet 310, and suppressing occurrence of voids and an increase in thermal resistance between the heat transfer sheet 310 and a surface facing the heat transfer sheet 310 due to the deformation of the heat transfer sheet 310.

In some embodiments, the electronic apparatus 300 may include a guide reception member 305. The guide reception member 305 may correspond to a member disposed in one of the first or second housing 302 and configured to receive the guide member 304 disposed in the other one of the first or second housing 302. The guide reception member 305 may include a space having an opening 305*a* facing the first direction.

Figure 15:
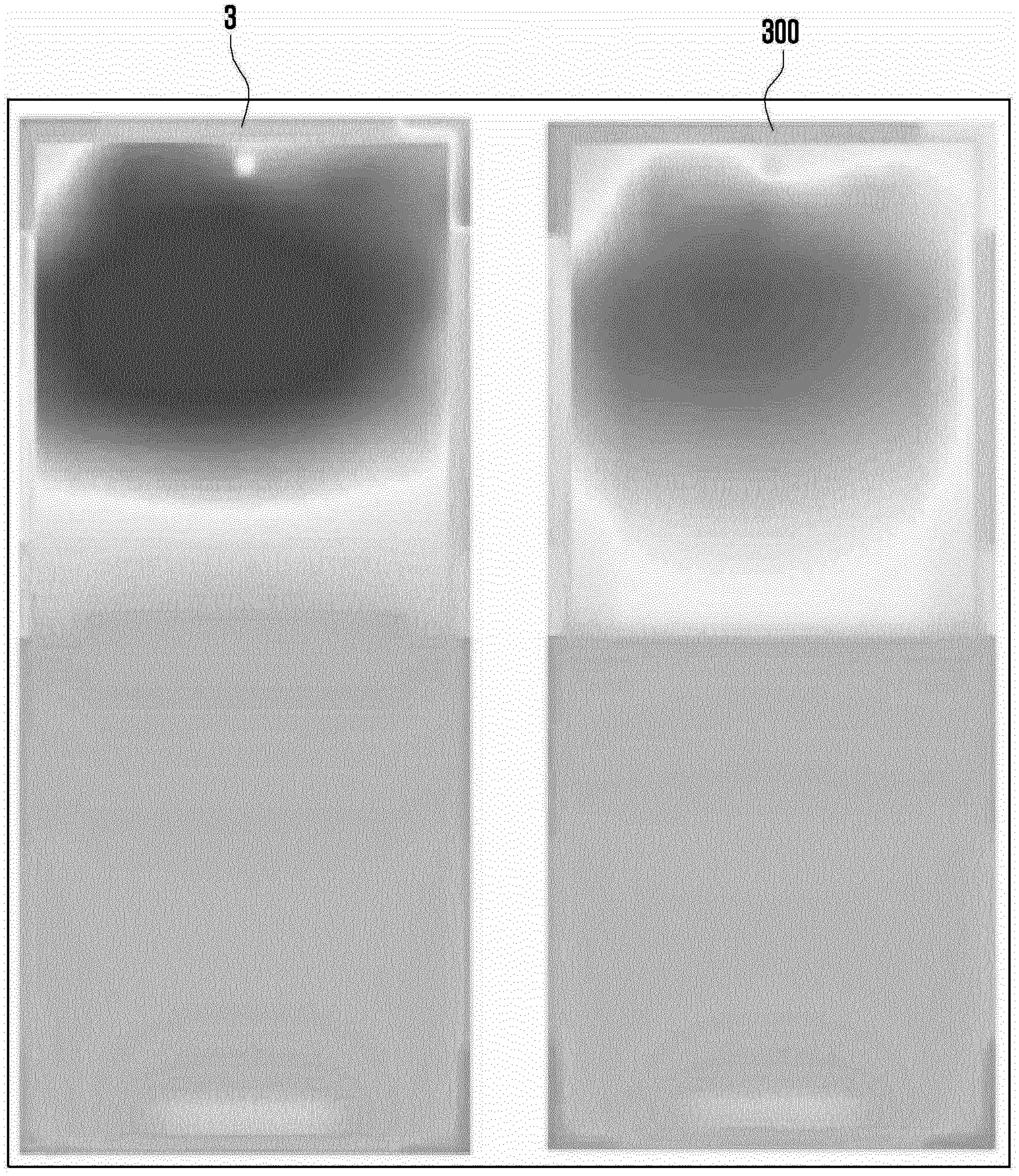
FIG. 15 is a view illustrating a heat dissipation degree of an electronic apparatus of the present disclosure and an electronic apparatus of a comparative example.

FIG. 15 is a view illustrating a heat dissipation degree of an electronic apparatus 300 of embodiments of the present disclosure and an electronic apparatus 3 of a comparative example.

In FIG. 15, dark shading represents areas with high temperatures, and light shading represents areas with low temperatures.

The electronic apparatus 300 of embodiments of the present disclosure and the electronic apparatus 3 of a comparative example are modeled and compared by simulating heat transfer. The electronic apparatus 3 of the comparative example is a rollable or slidable electronic apparatus not including the heat transfer sheet 310 of embodiments of the present disclosure and having an identical shape and identical heat generation amount to those of the electronic apparatus 300 of embodiments of the present disclosure.

Referring to FIG. 15, in the electronic apparatus 3 of the comparative example, heat generated from a heat generation source is concentrated in a partial area of a housing, resulting in extensive areas of high temperature around a periphery of the heat generation source. On the contrary, in the electronic apparatus 300 of embodiments of the present disclosure, heat generated from the heat generation source 303 is effectively disposed to a wider area of the first housing 301 and the second housing 302 by the heat transfer sheet 310 and thus a temperature of a periphery of the heat generation source 303 is reduced. Therefore, it may be seen that the present disclosure may effectively disperse heat generated in the electronic apparatus 300, reduce performance degradation due to heat generation of the electronic apparatus 300, and further reduce the risk of fire. Furthermore, according to embodiments of the present disclosure, the heat transfer sheet 310 may be disposed inside the electronic apparatus 300 while suppressing an increase in the thickness and spacings of the electronic apparatus 300.

An electronic apparatus 300 according to various embodiments of embodiments of the present disclosure may include a first housing 301, a second housing 302 coupled with respect to the first housing 301 to be slidable in a first direction away from the first housing 301 and in a second direction opposite to the first direction, a roller 320 having a rotation axis oriented perpendicular to the first and second directions and disposed in at least one of the second housing 302 or the first housing 301, and a heat transfer sheet 310 including a flexible and thermal conductive material and having one end portion coupled to the roller 320. The roller 320 may wind the heat transfer sheet 310 when the second housing 302 slides in the second direction, and unwind the heat transfer sheet 310 when the second housing slides in the first direction.

In various embodiments, the heat transfer sheet 310 may include a fixed portion 311 fixed to at least one of the first housing 301 or the second housing 302 and an extension portion 312 wound or unwound by the roller 320.

In various embodiments, the roller 320 may be disposed in the second housing 302, the fixed portion 311 may be fixed to the first housing 301, and the extension portion 312 may be located in an area of the first housing 301 including an area overlapping the second housing 302 when the second housing 302 slides in the second direction.

In various embodiments, the roller 320 may be disposed in the first housing 301, the fixed portion 311 may be fixed to the second housing 302, and the extension portion 312 may be located in an area of the second housing 302 including an area overlapping the first housing 301 when the second housing 302 slides in the second direction.

In various embodiments, the electronic apparatus 300 may include an elastic member 325 configured to apply a force in the first direction with respect to the roller 320.

In various embodiments, the roller 320 may be driven by a motor 324.

In various embodiments, at least a portion of the motor 324 may be located inside the roller 320.

In various embodiments, the roller 320 may include a rotation elastic member 326 that applies a rotational force having a rotational direction to wind the heat transfer sheet 310 with respect to the roller 320.

In various embodiments, the roller 320 may include an external body 321*a* having an internal space and allowing the heat transfer sheet 310 to be wound therearound, an internal shaft 327 passing through the roller 320 and relatively fixed with respect to rotation movement of the roller 320, and a rotation elastic member 326 fixed with respect to each of the internal shaft 327 and the external body 321*a* and applying the rotation force to the external body 321*a* based on the internal shaft 327.

In various embodiments, the rotation elastic member 326 may include a spiral torsion spring 326*a*.

In various embodiments, the roller 320 may include a body unit 321 on which the heat transfer sheet 310 is wound, journal units 322 disposed at both end portions of the body unit 321, and a chock unit 323 configured to support at least a portion of the journal units.

In various embodiments, the roller 320 may be driven by a motor 324 and one of the journal units 322 may be supported by the chock unit 323, and the other one of the journal units 322 may be supported by the motor 324.

In various embodiments, an elastic member 325 disposed between the second housing 302 and the chock unit 323 and configured to apply a force in the first direction with respect to the chock unit 323 may be included.

In various embodiments, at least one of the chock unit 323 may include a rotation elastic member 326 configured to apply a rotation force having a rotation direction for winding the heat transfer sheet 310 with respect to the journal units 322.

In various embodiments, the heat transfer sheet 310 may include a graphite sheet 313*a*.

In various embodiments, the heat transfer sheet 310 may include a heat conduction layer 313 and a protection layer 314 disposed on at least one surface of the heat conduction layer 313.

In various embodiments, the heat transfer sheet 310 may include a vertical heat transfer layer 315 disposed on a surface of the heat transfer sheet 310.

In various embodiments, a guide member 304 which slides in engagement with the roller 320 when the second housing 302 slides in the first direction and guides the unwound heat transfer sheet 310 to have a flat shape may be included.

In various embodiments, the guide member 304 may be located at a shoulder portion of the heat transfer sheet 310.

In various embodiments, the roller 320 and the guide member 304 may be disposed in the second housing 302, the fixed portion 311 may be fixed with respect to the second housing 302, and the first housing 301 may include a guide reception member 305 configured to receive the guide member 304 when the second housing 302 slides in the first direction.

The embodiments described in the specification and the drawings are merely presented as specific non-limiting examples to easily explain the technical features according to example embodiments of the present disclosure and help understanding of the embodiments of the present disclosure, and are not intended to limit the scope of the embodiments of the present disclosure. Therefore, the scope of the various embodiments disclosed herein should be construed as encompassing all changes or modifications derived from the technical ideas of the various embodiments disclosed herein in addition to the embodiments described herein.

What is claimed is:

1. An electronic apparatus comprising:

a first housing;

a second housing coupled to the first housing such as to be slidable in a first direction away from the first housing and in a second direction opposite to the first direction;

a roller comprising a rotation shaft oriented perpendicular to the first direction and the second direction, the roller being disposed in one from among the first housing and the second housing; and a heat transfer sheet comprising a flexible and thermally conductive material, wherein a first end portion of the heat transfer sheet is coupled to the roller, and wherein a second end portion of the heat transfer sheet, opposite to the first end portion, comprises a fixed portion fixed to a surface of the other from among the first housing and the second housing, wherein the roller is configured to wind the heat transfer sheet, around the roller, in a case where the second housing slides in the second direction and unwind the heat transfer sheet in a case where the second housing slides in the first direction.

2. The electronic apparatus of claim 1, wherein the heat transfer sheet further comprises:

an extension portion configured to be wound or unwound by the roller.

3. The electronic apparatus of claim 2, wherein the roller is in the second housing, wherein the fixed portion is fixed with respect to the first housing, and wherein the extension portion is located on an area of the first housing overlapping with the second housing in a case the second housing slides in the second direction.

4. The electronic apparatus of claim 2, wherein the roller is in the first housing, wherein the fixed portion is fixed with respect to the second housing, and wherein the extension portion is located on an area of the second housing overlapping with the first housing in a case where the second housing slides in the second direction.

5. The electronic apparatus of claim 1, further comprising an elastic member configured to apply a force in the first direction with respect to the roller.

6. The electronic apparatus of claim 1, wherein the roller further comprises a motor configured to drive the roller.

7. The electronic apparatus of claim 1, wherein the roller further comprises:

an external body having an internal space, wherein the heat transfer sheet is wound around the external body;

an internal shaft passing through the external body and relatively fixed with respect to rotation movement of the roller; and a rotation elastic member fixed with respect to each of the internal shaft and the external body and configured to apply rotation force to the external body.

8. The electronic apparatus of claim 7, wherein the rotation elastic member comprises a spiral torsion spring.

9. The electronic apparatus of claim 1, wherein the roller further comprises:

a body on which the heat transfer sheet is wound;

journals at two end portions of the body; and a chock configured to support at least a portion of the journals.

10. The electronic apparatus of claim 9, wherein the roller is configured to be driven by a motor, and wherein one of the journals is supported by the chock, and another one of the journals is supported by the motor.

11. The electronic apparatus of claim 9, further comprising an elastic member between the second housing and the chock and configured to apply a force in the first direction with respect to the chock.

12. The electronic apparatus of claim 9, wherein the chock comprises a rotation elastic member configured to apply a rotation force having a rotation direction for winding the heat transfer sheet with respect to the journals.

13. The electronic apparatus of claim 1, further comprising a guide member configured to slide in engagement with the roller in a case where the second housing slides in the first direction, and guide the heat transfer sheet to have a flat shape in a case where the heat transfer sheet is unwound.

14. The electronic apparatus of claim 13, wherein the guide member is at a shoulder portion of the heat transfer sheet.

15. The electronic apparatus of claim 13, wherein the roller and the guide member are in the second housing, wherein the fixed portion is fixed with respect to the second housing, and wherein the first housing comprises a guide reception space in a case where the second housing slides in the first direction.

16. The electronic apparatus of claim 1, wherein the heat transfer sheet comprises a graphite sheet.

17. The electronic apparatus of claim 1, wherein the heat transfer sheet comprises a heat conduction layer and a protection layer on the heat conduction layer.

18. The electronic apparatus of claim 1, wherein the heat transfer sheet comprises:

a heat conduction layer having a higher thermal conductivity in a plane direction of the heat conduction layer than in a thickness direction of the heat conduction layer; and a vertical heat transfer layer having a higher thermal conductivity in a thickness direction of the vertical heat transfer layer than in a plane direction of the vertical heat transfer layer.

19. The electronic apparatus of claim 1, further comprising a heat generation source in the first housing or the second housing, wherein the fixed portion is adjacent to the heat generation source.

20. The electronic apparatus of claim 1, wherein the roller is configured to:

wind the heat transfer sheet, in the case where the second housing slides in the second direction, such that an area of the heat transfer sheet on the second housing decreases; and unwind the heat transfer sheet, in the case where the second housing slides in the first direction, such that the area of the heat transfer sheet on the second housing increases.

* * * * *